US006532337B1

(12) United States Patent
Yoshinaka

(10) Patent No.: US 6,532,337 B1
(45) Date of Patent: Mar. 11, 2003

(54) DIGITAL-SIGNAL PLAYBACK APPARATUS

(75) Inventor: Tadaaki Yoshinaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/136,718

(22) Filed: Aug. 19, 1998

(30) Foreign Application Priority Data

Aug. 21, 1997 (JP) .............................. 9-224536

(51) Int. Cl.$^7$ ................................................ H04N 5/91
(52) U.S. Cl. ...................................... 386/116; 386/124
(58) Field of Search ............................. 386/46, 85, 90, 386/113, 116, 124, 125, 112; 369/59.16; 375/341; 360/38

(56) References Cited

U.S. PATENT DOCUMENTS 5,675,569 A * 10/1997 Yamaguchi et al. ..... 369/59.16

6,097,769 A * 8/2000 Sayiner et al. .............. 375/341

FOREIGN PATENT DOCUMENTS

JP    408069672 A  *  3/1996

* cited by examiner

*Primary Examiner*—Huy Nguyen
(74) *Attorney, Agent, or Firm*—Frommer Lawrence & Haug LLP; William S. Frommer; Bruno Polito

(57) ABSTRACT

A viterbi decoder employed in a digital-signal playback apparatus provided by the present invention such as a video tape recorder and an optical-disc apparatus executes the steps of carrying out tentative discrimination on an input signal, equalizing the input signal in accordance with a result of the tentative discrimination, limiting the number of state transitions of the equalized signal and forming a judgment to select a most probable state transition among the limited number of state transitions. As a result, the viterbi decoder is suited for viterbi decoding and allows the viterbi decoding to be carried out on a digital signal by using a simple configuration.

21 Claims, 18 Drawing Sheets

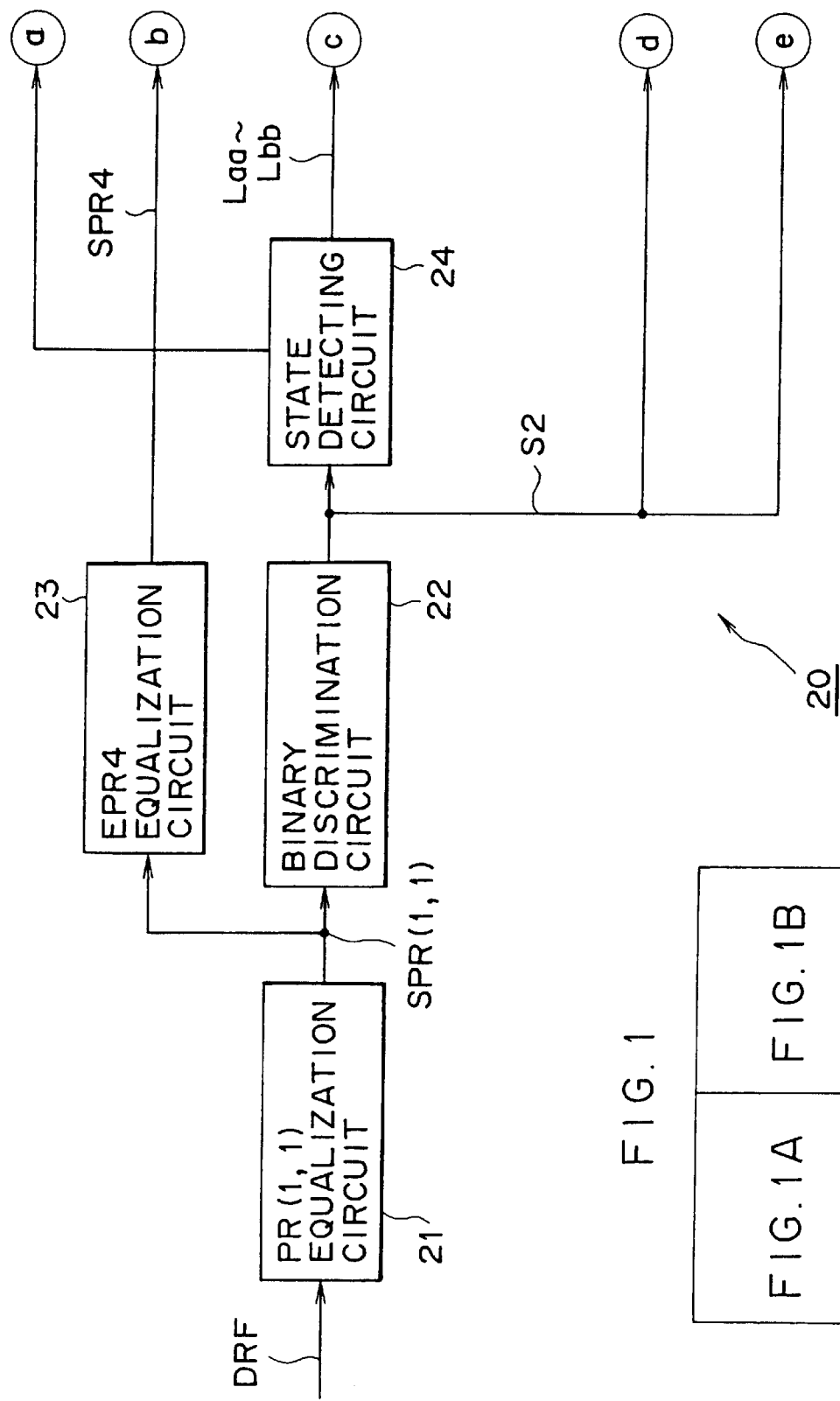

FIG. 7

| PREVIOUS INPUTS | | | STATE | INPUT | OUTPUT | NEXT STATE |
|---|---|---|---|---|---|---|
| a[k-3] | a[k-2] | a[k-1] | b[k-1] | a[k] | c[k] | b[k] |
| 0 | 0 | 0 | S000 | 0 | 0 | S000 |
| 0 | 0 | 0 | S000 | 1 | 1 | S001 |
| 0 | 0 | 1 | S001 | | | |
| 0 | 0 | 1 | S001 | 1 | 2 | S011 |
| 0 | 1 | 1 | S011 | 0 | 0 | S110 |
| 0 | 1 | 1 | S011 | 1 | 1 | S111 |
| 1 | 0 | 0 | S100 | 0 | 0 | S000 |
| 1 | 0 | 0 | S100 | 1 | -1 | S001 |
| 0 | 1 | 0 | S110 | 0 | -2 | S100 |
| 0 | 1 | 0 | S110 | | | |
| 1 | 1 | 1 | S111 | 0 | -1 | S110 |
| 1 | 1 | 1 | S111 | 1 | 0 | S111 |

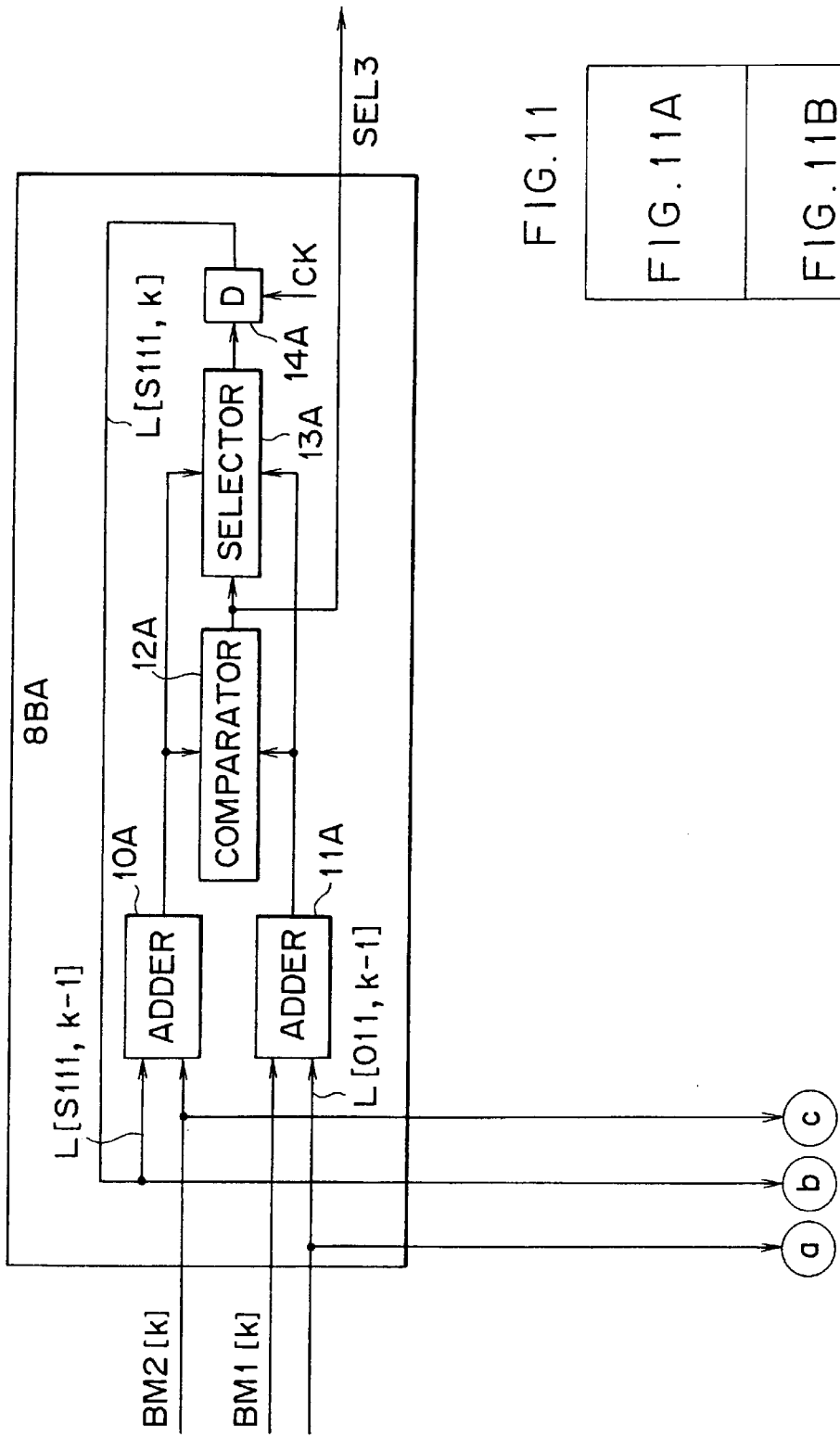

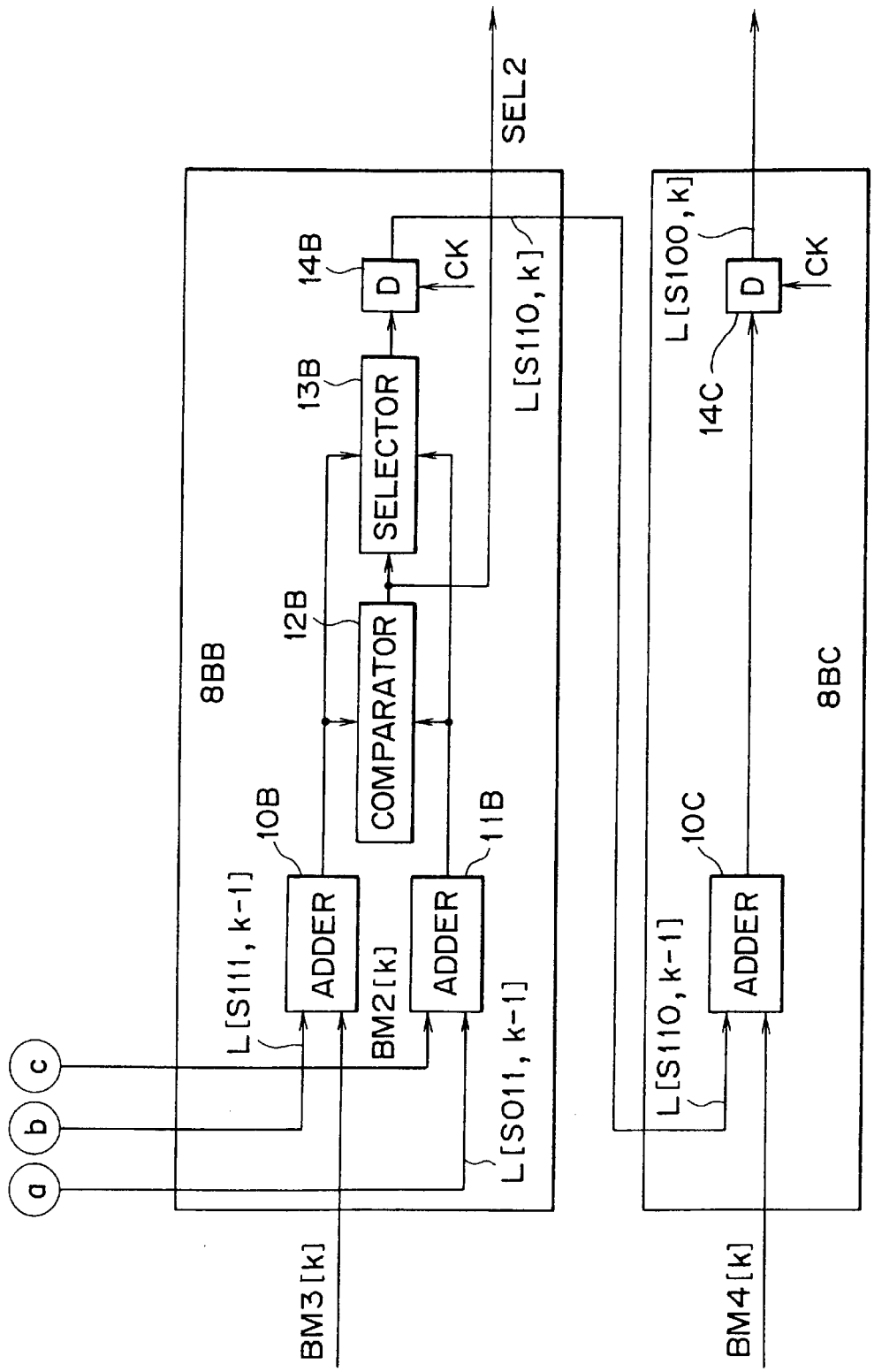

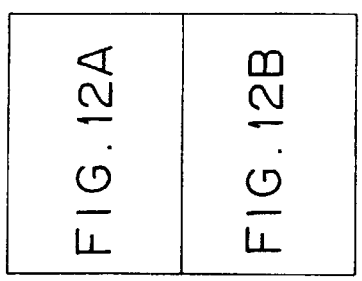
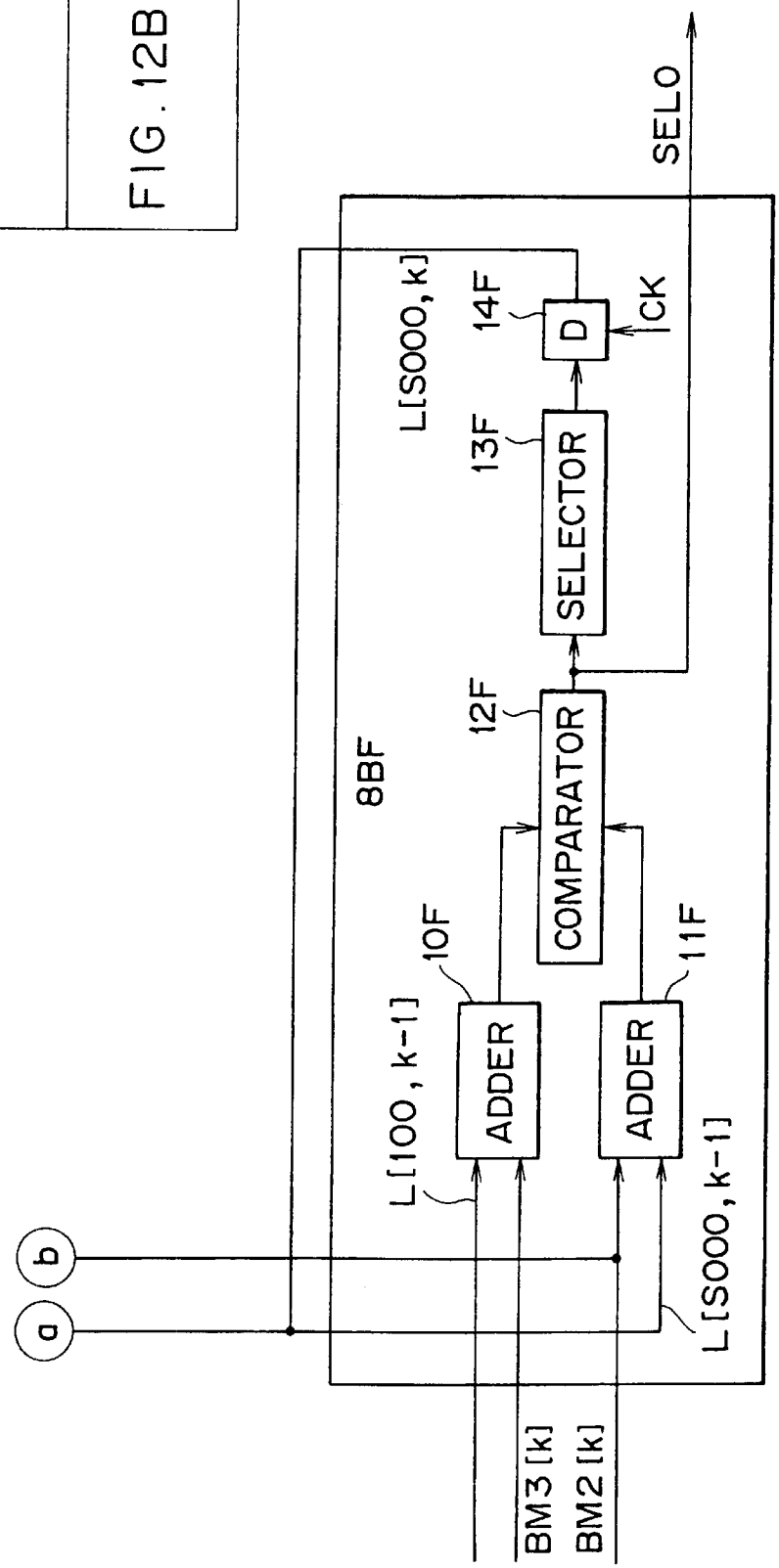
FIG. 12B

DIGITAL-SIGNAL PLAYBACK APPARATUS

BACKGROUND OF THE INVENTION

The present invention relates to a digital-signal playback apparatus and can be applied to bitabi decoding carried out typically in a video tape recorder and an optical-disc apparatus. By equalizing an input signal on the basis of a result of tentative discrimination of an input signal, limiting the number of possible state transitions of the equalized signal and determining a most probable state transition among the limited number of possible state transitions, it is possible to carry out viterbi decoding on a digital signal by using a simple configuration and, when necessary, at a high speed.

In the conventional playback equipment such a video tape recorder and an optical-disc apparatus, by processing a playback signal by execution of viterbi decoding, a digital signal recorded at a high density can be played back with a high degree of reliability.

In the viterbi decoding, n different states determined by intercode interference are defined by a combination of most recently received input data and, for new incoming input data, the input data is processed by updating the present state into a new state following the present state. To put it concretely, the n different states are determined by immediately preceding (m−1) bits where m is the length of the intercode interference. For example, if the input data is 1 and 0 digital data, n different states exist where $n=2^{(m-1)}$.

For n different states prescribed as described above, the degree of likelihood of a transition from the present state to a subsequent state is represented by a cumulative value of the squares of differences between an amplitude reference value and an actual playback signal which is accumulated prior to the occurrence of such a state transition. In this case, the distribution of noise included in the playback signal is assumed to be a Gaussian distribution and the amplitude reference value is the value of the playback signal in a state with no noise. Thus, in the viterbi decoding, a cumulative value is computed for each path for which a transition from the present state to one of the n different states is probable and an impending transition is judged to be a transition occurring through a path with the highest degree of likelihood or with a smallest cumulative value. Then, the present state is updated into a new state determined by the path with the highest degree of likelihood and, at the same time, the degree of likelihood of each transition to a further state following the new state and the history of discrimination values are also updated as well for the new state.

If most probable state transitions are sequentially detected one transition after another in this way, at a predetermined stage, pieces of history data of several immediately preceding bits are merged into a single piece of history data, confirming discrimination results obtained so far. In this way, the viterbi encoding identifies a playback signal.

In the viterbi decoding for processing a playback signal as described above, due to the fact that a playback signal can be discriminated by utilizing a signal power of the playback signal at its maximum when noise superposed on the playback signal is random noise, an error rate can be improved in comparison with a decoding system wherein decoding is carried out by comparing the playback signal with a predetermined threshold value for each bit.

FIG. 7 is a table showing state transitions in the case of an application of EPR (Extended Partial Response) 4 equalization to RLL (Run Length Limited) (1, 7) code. It should be noted that the RLL (1, 7) code is code wherein the logic value 1 or 0 appears consecutively at least twice in a row, that is, the logic value 1 or 0 never appears once. This limitation is called d=1 limitation. Thus, the RLL (1, 7) code is code produced by an encoding system based on the d=1 limitation. On the other hand, the EPR4 equalization is a PR (1, 1, −1, −1) technique wherein, for '1' input data, intercode interference occurs till the bit lagging behind the input data by 3 bits.

Thus, in the application of EPR (Extended Partial Response) 4 equalization to RLL (Run Length Limited) (1, 7) code, a history of previous input data up to the a bit leading ahead of new input data by 3 bits univocally determines a state transition (hence, output data) caused by the new input data following the history of previous input data. For example, let a [k] be new input data and a [k-1], a [k-2] and a [k-3] be pieces of previous input data leading ahead of the input data a [k] by 1 clock, 2 clocks and 3 clocks respectively. A state b [k-1] determined by the pieces of input data a [k-1], a [k-2] and a [k-3] is expressed by a string of the symbol S and values of the pieces of input data a [k-1], a [k-2] and a [k-3]. For example, notation S000 shown in the table of FIG. 7 is the state determined by pieces of input data having values of 0, 0 and 0. As shown in the table, in the state (S000), output data c [k] of 0 is obtained from input data a [k] of 0 and the present state b [k-1] changes from S000 to a next state b [k] of S000.

In the case of RLL (1, 7) code, the states (S010) and (S101) do not exist due to the d=1 limitation described above. Each state b [k-1] can transit to either of 2 states in dependence on whether the input data is 0 or 1. Since preceding 3 bits of input data provide a total of different 8 states, the exclusion of the states (S010) and (S101) leaves only 6 different states. In addition, in the case of RLL (1, 7) code, the output c [k] has 5 different amplitude reference values, namely, −2, −1, 0, 1 and 2. Transitions among states are expressed by a trellis diagram as shown in FIG. 8.

In the viterbi decoding, the squares (branch metrics) of differences between an EPR4 equalization playback signal and an EPR4 equalization amplitude reference value are accumulated by repeatedly referring to the trellis diagram shown in FIG. 8 and, then, a path that minimizes the cumulative value is selected. Finally, the input signal is decoded.

FIG. 9 is a block diagram showing a playback signal processing system employed in a video tape recorder to which the viterbi decoder of this type is applied. The video tape recorder 1 records and plays back a digital video signal by application of the EPR4 equalization to the RLL (1, 7) code described above. That is to say, an integrating equalizer 2 carries out Nyquist equalization on a playback signal RF generated by a magnetic head to output an analog playback signal RF. A comparison circuit 3 converts a playback signal RF output by the integrating equalizer 2 into binary data, outputting a binary signal S1 as a result of the binary conversion.

A phase comparator 4 compares the phase of a clock signal CK generated by a voltage controlled oscillator (VCO) 5 with the phase of the binary signal S1, outputting a result of the phase comparison to an integrator 6. The integrator 6 imposes a band limit on the result of the phase comparison, outputting an error signal to the voltage controlled oscillator 5. The voltage controlled oscillator 5 generates the clock signal CK by varying the oscillation frequency so that the error signal is sustained at a predetermined level. The phase comparator 4, the voltage controlled oscillator 5 and the integrator 6 constitute a PLL circuit for generating the clock signal CK from the playback signal RF output by the integrating equalizer 2.

An analog-to-digital (A/D) converter 7 converts the analog playback signal RF output by the integrating equalizer 2 by using the clock signal CK as a reference into a digital playback signal DRF as a result of the A/D conversion. A conventional viterbi decoder 8 receives the digital playback signal DRF, discriminating and outputting a binary decoded output D1, a signal to be recorded into a video tape, from the binary decoded output D1.

FIG. 10 is a block diagram showing the conventional viterbi decoder 8. As shown in the figure, the viterbi decoder 8 comprises a branch-metric computing circuit 8A, a branch-metric processing circuit 8B and a path memory unit 8C. The branch metric computing circuit 8A computes branch metrics BM0 [k] to BM4 [k] for the 5 amplitude reference values respectively by execution of processing based on Eq. (1) given below for each sample value of the digital video signal DRF. The branch metrics BM0 [k] to BM4 [k] are each the square of a difference between the level of the actual playback signal sig [k], that is, the digital playback signal DRF, and the value of a playback signal obtained by assuming that no noise exist in a state thereof, that is, the amplitude reference value. As described above, the amplitude reference value can be 1 of 5 values, namely, 2, 1, 0, −1 and −2. Thus, the branch metrics BM0 [k] to BM4 [k] are each a Euclid distance of the playback signal from an amplitude reference value.

$$BM0[k]=(sig[k]-2)^2$$

$$BM1[k]=(sig[k]-1)^2$$

$$BM2[k]=(sig[k])^2$$

$$BM3[k]=(sig[k]+1)^2$$

$$BM4[k]=(sig[k]+2)^2 \quad (1)$$

To put it concretely, the branch metric computing circuit 8A comprises a plurality of systems each including a subtraction circuit for subtracting an amplitude reference value from the digital playback signal DRF, and the same plurality of systems each including a multiplier for finding a square of a result of subtraction produced by the subtraction circuit.

The branch metric processing circuit 8B computes metrics L(S000, k) to L(S111, k) from the branch metrics BM0[k] to BM4[k] computed by the branch metric computing circuit 8A and immediately preceding metrics L(SXXX, k-1) by execution of processing based on Eq. (2) given as follows.

$$L(S111, k)=\min\{1(S111, k\text{-}1)+BM2[k], L(S011, k\text{-}1)+BM1[k]\} \quad (2\text{-}1)$$

$$L(S110, k)=\min\{1(S111, k\text{-}1)+BM3[k], L(S011, k\text{-}1)+BM2[k]\} \quad (2\text{-}2)$$

$$L(S100, k)=L(S110, k\text{-}1)+BM4[k] \quad (2\text{-}3)$$

$$L(S011, k)=L(S001, k\text{-}1)+BM0[k] \quad (2\text{-}4)$$

$$L(S001, k)=\min\{1(S100, k\text{-}1)+BM2[k], L(S000, k\text{-}1)+BM1[k]\} \quad (2\text{-}5)$$

$$L(S000, k)=\min\{L(S100, k\text{-}1)+BM3[k], L(S000, k\text{-}1)+BM2[k]\} \quad (2\text{-}6)$$

where notation min(a, b) denotes a function to select the smaller one between the values a and b.

The path memory unit 8C outputs a binary decoded signal D1 based on results of the computation carried out by the branch metric processing circuit 8B.

FIGS. 11 and 12 are block diagrams showing a detailed configuration of the branch metric processing circuit 8B. AS shown in the figures, the branch metric processing circuit 8B comprises metric computing circuits 8BA to 8BF each for computing the metrics L (S111, k) to L (S000, k) of the states (S111) to (S000) respectively.

To put it in detail, in the first metric computing circuit 8BA for computing a metric with respect to a transition to the first state (S111), an adder 10A adds a metric L (S111, k-1), a metric of the first state (S111) computed by the first metric computing circuit 8BA at a time preceding the present time by 1 clock to a branch metric BM2 (k) computed by the branch-metric computing circuit 8A. Thus, the adder 10A produces the first term of the expression on the right-hand side of Eq. (2-1).

An adder 11A adds a metric L (S011, k-1), a metric of the fourth state (S011) computed by the fourth metric computing circuit 8BD at a time preceding the present time by 1 clock to a branch metric BM1 (k) computed by the branch metric computing circuit 8A. Thus, the adder 11A produces a result of addition corresponding to the second term of the expression on the right-hand side of Eq. (2-1).

A comparison circuit 12A compares the data output by the adder 10A with that output by the adder 11A, outputting a result of comparison SEL3. The result of comparison SEL3 output by the comparison circuit 12A is an outcome of formation of a judgment as to whether a transition from the first state (S111) to the first state (S111) or from the fourth state (S011) to the first state (S111) has a higher degree of likelihood, that is, whether a transition from the first state (S111) to the first state (S111) or from the fourth state (S011) to the first state (S111) is more probable.

A selector 13A selects either the result of addition produced by the adder 10A or the result of addition produced by the adder 11A in dependence on the judgment outcome SEL3 output by the comparison circuit 12A. A latch (D) 14A latches an output selected by the selector 13A. Thus, the latch 14A latches and holds the value of the expression on the right-hand side of Eq. (2-1), that is, the final result of the processing carried out by the first metric computing circuit 8BA to represent the metric of the first state (S111).

In the second metric computing circuit 8BB for computing a metric with respect to a transition to the second state (S110), on the other hand, an adder 10B adds a metric L (S111, k-1), a metric of the first state (S111) computed by the first metric computing circuit 8BA at a time preceding the present time by 1 clock to a branch metric BM3 (k) computed by the branch metric computing circuit 8A. Thus, the adder 10B produces the result of addition corresponding to the first term of the expression on the right-hand side of Eq. (2-2).

An adder 11B adds a metric L (S011, k-1), a metric of the fourth state (S011) computed by the fourth metric computing circuit 8BD at a time preceding the present time by 1 clock to a branch metric BM2 (k) computed by the branch metric computing circuit 8A. Thus, the adder 11B produces the result of addition corresponding to the second term of the expression on the right-hand side of Eq. (2-2).

A comparison circuit 12B compares the data output by the adder 10B with that output by the adder 11B, outputting a result of comparison SEL2. The result of comparison SEL2 output by the comparison circuit 12B is an outcome of formation of a judgment as to whether a transition from the first state (S111) to the second state (S110) or from the fourth state (S011) to the second state (S110) has a higher degree of likelihood, that is, whether a transition from the first state (S111) to the second state (S110) or from the fourth state (S011) to the second state (S110) is more probable.

A selector 13B selects either the result of addition produced by the adder 10B or the result of addition produced by the adder 11B in dependence on the judgment outcome SEL2 output by the comparison circuit 12B. A latch (D) 14B latches an output selected by the selector 13B. Thus, the latch 14B latches and holds the value of the expression on the right-hand side of Eq. (2-2), that is, the final result of the processing carried out by the second metric computing circuit 8BB to represent the metric of the second state (S110).

In the third metric computing circuit 8BC for computing a metric with respect to a transition to the third state (S100), on the other hand, an adder 10C adds a metric L (S110, k-1), a metric of the second state (S110) computed by the second metric computing circuit 8BB at a time preceding the present time by 1 clock to a branch metric BM4 (k) computed by the branch metric computing circuit 8A and outputs the result of the addition to a latch (D) 14C for latching the result. Thus, the latch 14C latches and holds the value of the expression on the right-hand side of Eq. (2-3), that is, the result of the processing carried out by the third metric computing circuit 8BC to represent the metric of the third state (S100).

In the fourth metric computing circuit 8BD of FIG. 12 for computing a metric with respect to a transition to the fourth state (S011), on the other hand, an adder 10D adds a metric L (S001, k-1), a metric of the fifth state (S001) computed by the fifth metric computing circuit 8BE at a time preceding the present time by 1 clock to a branch metric BM0 (k) computed by the branch metric computing circuit 8A and outputs the result of the addition to a latch (D) 14D for latching the result. Thus, the latch 14D latches and holds the value of the expression on the right-hand side of Eq. (2-4), that is, the result of the processing carried out by the fourth metric computing circuit 8BD to represent the metric of the fourth state (S011).

In the fifth metric computing circuit 8BE for computing a metric with respect to a transition to the fifth state (S001), on the other hand, an adder 10E adds a metric L (S100, k-1), a metric of the third state (S100) computed by the third metric computing circuit 8BC at a time preceding the present time by 1 clock to a branch metric BM2 (k) computed by the branch metric computing circuit 8A. Thus, the adder 10E produces the first term of the expression on the right-hand side of Eq. (2-5).

An adder 11E adds a metric L (S000, k-1), a metric of the sixth state (S000) computed by the sixth metric computing circuit 8BF at a time preceding the present time by 1 clock to a branch metric BM1 (k) computed by the branch metric computing circuit 8A. Thus, the adder 11E produces the result of addition corresponding to the second term of the expression on the right-hand side of Eq. (2-5).

A comparison circuit 12E compares the data output by the adder 10E with that output by the adder 11E, outputting a result of comparison SEL1. The result of comparison SEL1 output by the comparison circuit 12E is an outcome of formation of a judgment as to whether a transition from the third state (S100) to the fifth state (S001) or from the sixth state (S000) to the fifth state (S001) has a higher degree of likelihood, that is, whether a transition from the third state (S100) to the fifth state (S001) or from the sixth state (S000) to the fifth state (S001) is more probable.

A selector 13E selects either the result of addition produced by the adder 10E or the result of addition produced by the adder 11E in dependence on the judgment outcome SEL1 output by the comparison circuit 12E. A latch (D) 14E latches an output selected by the selector 13E. Thus, the latch 14E latches and holds the value of the expression on the right-hand side of Eq. (2-5), that is, the final result of the processing carried out by the fifth metric computing circuit 8BE to represent the metric of the fifth state (S001).

In the sixth metric computing circuit 8BF for computing a metric with respect to a transition to the sixth state (S000), on the other hand, an adder 10F adds a metric L (S100, k-1), a metric of the third state (S100) computed by the third metric computing circuit 8BC at a time preceding the present time by 1 clock to a branch metric BM3 (k) computed by the branch metric computing circuit 8A. Thus, the adder 10F produces the result of addition corresponding to the first term of the expression on the right-hand side of Eq. (2-6).

An adder 11F adds a metric L (S000, k-1), a metric of the sixth state (S000) computed by the sixth metric computing circuit 8BF at a time preceding the present time by 1 clock to a branch metric BM2 (k) computed by the branch metric computing circuit 8A. Thus, the adder 11F produces the result of addition corresponding to the second term of the expression on the right-hand side of Eq. (2-6).

A comparison circuit 12F compares the data output by the adder 10F with that output by the adder 11F, outputting a result of comparison SEL0. The result of comparison SEL0 output by the comparison circuit 12F is an outcome of formation of a judgment as to whether a transition from the sixth state (S000) to the sixth state (S000) or from the third state (S100) to the sixth state (S000) has a higher degree of likelihood, that is, whether a transition from the sixth state (S000) to the sixth state (S000) or from the third state (S100) to the sixth state (S000) is more probable.

A selector 13F selects either the result of addition produced by the adder 10F or the result of addition produced by the adder 11F in dependence on the judgment outcome SFL0 output by the comparison circuit 12F. A latch (D) 14F latches an output selected by the selector 13F. Thus, the latch 14F latches and holds the value of the expression on the right-hand side of Eq. (2-6), that is, the final result of the processing carried out by the sixth metric computing circuit 8BF to represent the metric of the sixth state (S000).

FIGS. 13, 14 and 15 are block diagrams showing the configuration of the path memory unit 8C. As shown in the figures, the path memory unit 8C comprises 6 path memories 8CA to 8CF for the 6 different states (S111) to (S000) respectively. The path memories 8CA, 8CB, 8CE and 8CF are each a path memory used for inheriting a history (discrimination result) of one of two immediately preceding states in dependence on the judgment result SEL3, SEL2, SEL1 or SEL0 respectively which are output by the metric computing circuits 8BA, 8BB, 8BE or 8BF respectively as described above. On the other hand, the path memories 8CC and 8CD are each a path memory for which there is only one history (discrimination result) to be inherited.

FIG. 13 is a block diagram showing a path memory 8CC or 8CD enclosed in a dashed-line block for the third or fourth state (S100) or (S011) respectively for which there is only one history (discrimination result) to be inherited. In the case of the third path memory 8CC, a transition to the third state (S100) thereof occurs through inheritance of the history of the second state (S110) as indicated by the state transitions shown in FIG. 8. A history stored in the third path memory 8CC may then be output to the fifth or sixth path memory 8CE or 8CF for the fifth or sixth state (S001) or (S000) respectively. In addition, data with a fixed value of 0 is supplied to the first latch (D) 16A of the third path memory 8CC in the event of a state transition.

The fourth 8CD path memory for the fourth state (S011) is the same as the third path memory 8CC described above except for the following differences. As shown in FIG. 13, in the first place, a transition to the fourth state (S011) thereof occurs through inheritance of the history of the fifth state (S001) in place of the second state (S110). In the second place, data with a fixed value of 1 instead of 0 is supplied to a latch (D) 16A at the first stage of the fourth path memory 8CD. In the third place, a history stored in the fourth path memory 8CD may be output to the first or second path memory 8CA or 8CB for the first or second state (S111) or (S110) respectively instead of the fifth or sixth path memory 8CE or 8CF for the fifth or sixth state (S001) or (S000). In FIG. 13, the components of the fourth path memory 8CD replacing those of the third path memory 8CC are each enclosed in parentheses after the corresponding component of the third path memory 8CC. In the following description, only the third path memory 8CC is explained. Description of the fourth path memory 8CD is omitted to avoid duplication of explanation.

The third path memory 8CC comprises latches 16A to 16N which constitute a predetermined number of stages. The number of stages is at least equal to the number of bits to be inherited from one path memory to another. Typically, the number of stages is in the range of 16 to 32 bites. The fixed data having a value of 1 and the history held in the second path memory 8CB are latched with timing determined by the clock signal CK. At that time, a binary decoded output D1 is generated from the latch 16N at the last stage.

The first path memory 8CA, one of the remaining path memories 8CA, 8CB, 8CE and 8CF, comprises latches 16A to 16N at as many stages as the third path memory 8CC connected to each other in series as shown in FIG. 14. Between each two adjacent latches of the latches 16A to 16N, a selector 17I where I=A to M is provided. The selectors 17A to 17M each select either a history bit output by the fourth path memory 8CD or the history bit of an immediately preceding latch.

The history bits are selected by the selectors 17A to 17M in accordance with the judgment result SEL3. To put it in detail, when the first metric computing circuit 8BA associated with the first path memory 8CA selects a metric from the fourth state (S011), the judgment result SEL3 drives the selectors 17A to 17M employed in the first path memory 8CA to select history bits from the fourth path memory 8CD. When the first metric computing circuit 8BA selects a metric from the first state (S111) itself, on the other hand, the judgment result SEL3 drives the selectors 17A to 17M employed in the first path memory 8CA to select history bits held by the first path memory 8CA itself. The latch 16A at the first stage always latches fixed data with the value of 1 without regard to these 2 different state transitions. In addition, a binary decoded output D1 is generated from the latch 16N at the last stage.

The sixth path memory 8CF for the sixth state (S000) is the same as the first path memory 8CA described above except for the following differences. As shown in FIG. 14, in the first place, a transition to the sixth state (S000) thereof occurs through selective inheritance of the history of the third path memory 8CC in place of the fourth path memory 8CD. In the second place, data with a fixed value of 0 instead of 1 is supplied to the first latch (D) 16A of the sixth path memory 8CF in the event of inheritance of either history bits. In the third place, a history stored in the sixth path memory 8CF may be output to the fifth or sixth path memory 8CE or 8CF for the fifth or sixth state (S001) or (S000) respectively instead of the first or second path memory 8CA or 8CB for the first or second state (S111) or (S110). In the fourth place, the select signal to drive the selectors 17A to 17M is the judgment result SEL0 instead of SEL3. In FIG. 14, the components of the sixth path memory 8CF replacing those of the first path memory 8CA are each enclosed in parentheses after the corresponding component of the first path memory 8CA. Description of the sixth path memory 8CF is omitted to avoid duplication of explanation.

The second path memory 8CB comprises latches 16A to 16N at as many stages as the third path memory 8CC as shown in FIG. 15. Except the latch 16A at the first stage, the inputs of the latches 16B to 16N are connected to selectors 17A to 17M respectively for selecting either the history of the first path memory 8CA or the history of the fourth path memory 8CD.

The history of the first path memory 8CA or the history of the fourth path memory 8CD is selected by the selectors 17A to 17M in accordance with the judgment result SEL2. To put it in detail, when the second metric computing circuit 8BB associated with the second path memory 8CB selects a metric from the first state (S111), the judgment result SEL2 drives the selectors 17A to 17M employed in the second path memory 8CB to select the history from the first path memory 8CA. When the second metric computing circuit 8BB selects a metric from the fourth state (S011), on the other hand, the judgment result SEL2 drives the selectors 17A to 17M to select the history from the fourth path memory 8CD. The latch 16A at the first stage always latches fixed data with the value of 0 without regard to these 2 different transitions. In addition, a binary decoded output D1 is generated from the latch 16N at the last stage.

The fifth path memory 8CE for the fifth state (S001) is the same as the second path memory 8CB described above except for the following differences. As shown in FIG. 15, in the first place, a transition to the fifth state (S001) thereof occurs through selective inheritance of the history of the sixth or third path memory 8CF or 8CC instead of the history of the first or fourth path memory 8CA or 8CD respectively. In the second place, data with a fixed value of 1 instead of 0 is supplied to the first latch (D) 16A of the fourth path memory 8CD in the event of inheritance of either history. In the third place, a history stored in the fifth path memory 8CE may be output to the fourth path memory 8CD for the fourth state (S011) instead of the third path memory 8CC for the third state (S100). In the fourth place, the select signal to drive the selectors 17A to 17M is the judgment result SEL1 instead of SEL2. In FIG. 15, the components of the fifth path memory 8CE replacing those of the second path memory 8CB are each enclosed in parentheses after the corresponding component of the second path memory 8CA. Description of the fifth path memory 8CE is omitted to avoid duplication of explanation.

In these configurations, when history bits are inherited at the predetermined number of stages, the latches in each of the path memories 8CA to 8CF hold bits of the same history. In the viterbi decoder 8, binary decoded data D1 is output from the latch 16N at the last stage of a path memory selected from the memories 8CA to 8CF.

As described above, in each of the metric computing circuits 8BA to 8BF employed in the viterbi decoder 8, a branch metric BM output by the branch metric computing circuit 8A is added to a metric L [k-1] found previously and, if necessary, results of addition are compared with each other. In accordance with a result of comparison, one of the results of addition is then selected and latched as a metric L [k] computed for input data a [k]. It is necessary to repeat the computation for each clock period of the input data a [k].

As a result, there is raised a problem that it is difficult to apply the conventional viterbi decoder 8 to input data a [k] with high-speed transmission.

In addition, for each state, it is necessary to compute a branch metric BM and a metric L as well as to further store a history, giving rise to another problem of a complex configuration as a whole. As described above, in the case of the EPR4 equalization, processing needs to be carried out for only 6 states. In the case of EEPR4 (PR (1, 2, 0, −2, −1)), by the way, it is necessary to perform processing for 10 states. As a result, if data must be recorded and transmitted at a high density, the size of the circuit will increase exponentially.

SUMMARY OF THE INVENTION

It is thus an object of the present invention addressing the problems described above to provide a digital-signal playback apparatus capable of carrying out viterbi decoding in a simple configuration and a digital-signal playback apparatus capable of carrying out viterbi decoding at a high speed.

In order to solve the problems described above, in the present invention, an input signal is tentatively discriminated at predetermined sampling periods and a binary signal with the same timing as change points of a correct discrimination result or with timing delayed by 1 clock period from the change points of the correct discrimination result is generated. In addition, this input signal is equalized to generate an equalized signal. Further, the number of possible state transitions of the equalized signal is limited on the basis of this binary signal and a most probable state transition is detected from the possible state transitions of the equalized signal which are limited in number to discriminate an input signal.

By tentatively discriminating an input signal at predetermined sampling periods and generating a binary signal with the same change-point timing or with change-point timing delayed by 1 clock period, an input signal can be discriminated by a sufficient discrimination margin even though there is an error of 1 clock with respect to edge timing. In addition, by typically equalizing this input signal if necessary, the discrimination margin can be increased. Furthermore, the number of possible state transitions of the equalized signal can be limited on the basis of this binary signal. By detecting a most probable state transition from the possible state transitions which are limited in number to discriminate an input signal, the most probable state transition can be detected by carrying out less processing due to the reduced number of possible state transitions and the overall configuration can be made simple commensurately. In addition, by limiting the number of possible state transitions, the number of transition paths can also be reduced as well. If necessary, processing to update degrees of likelihood accompanying selection of a state transition can be executed at a period equal to at least 2 sampling periods.

BRIEF DESCRIPTION OF THE DRAWINGS

An embodiment of the present invention will be described by referring to the following diagrams wherein:

FIG. 7 is a table showing state transitions in EPR (Extended Partial Response) 4 equalization;

FIG. 11 is a block diagram showing a detailed configuration of the branch metric processing circuit shown in FIG. 10;

DETAILED DESCRIPTION OF THE PREFERRED EMBODIMENT

The present invention will become more apparent from a careful study of the following detailed description of a preferred embodiment with reference to the accompanying diagrams.

Figure 1B:
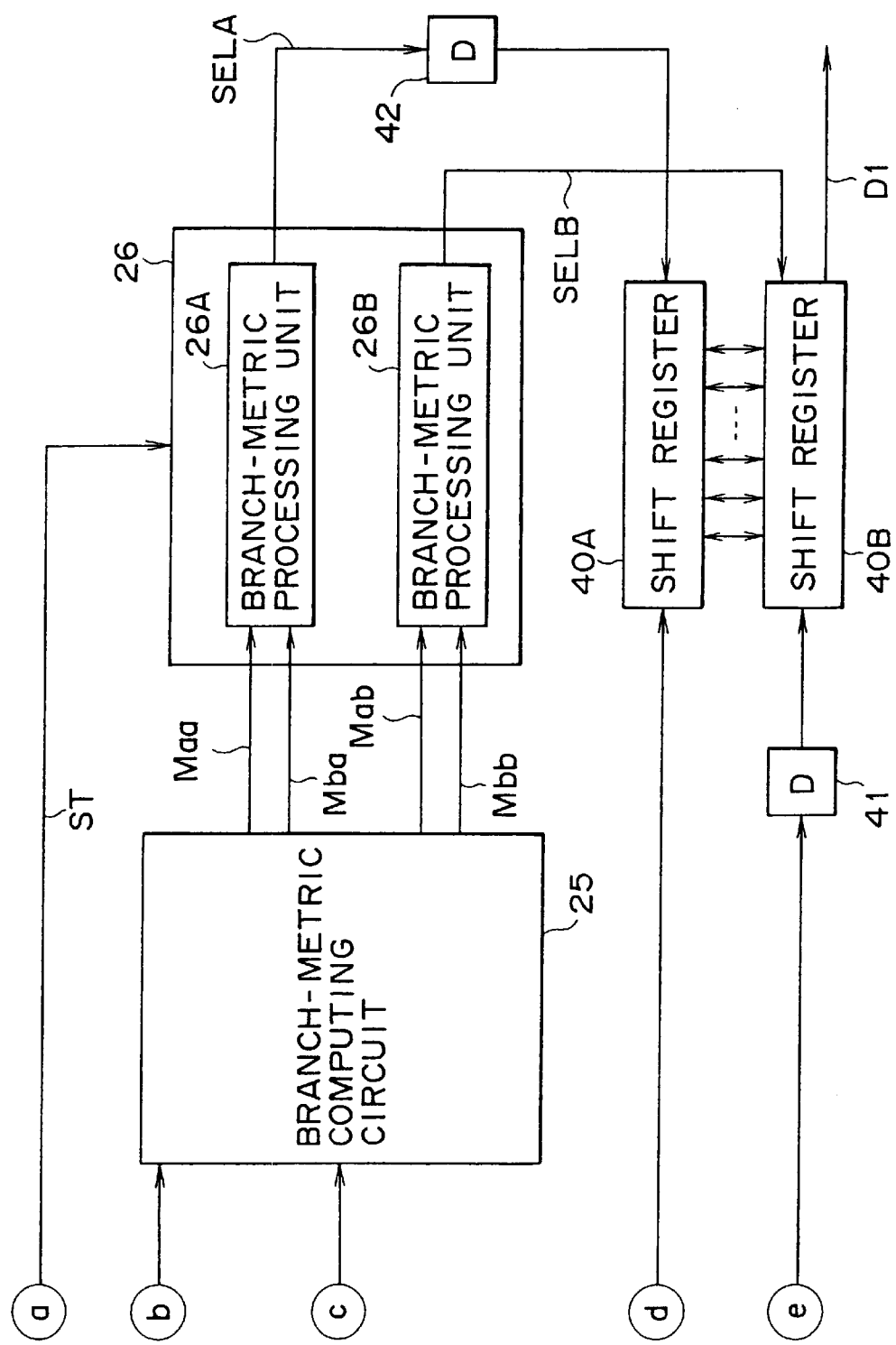
FIG. 1 is a block diagram showing the configuration of a viterbi decoder as implemented by an embodiment of the present invention.

FIG. 1 is a block diagram showing the configuration of a viterbi decoder 20 as implemented by an embodiment of the present invention. The viterbi decoder 20 can be used to replace the viterbi decoder 8 described earlier by referring to FIG. 9. To be more specific, the viterbi decoder 20 can be applied to case in which the EPR4 equalization is applied to RLL (1, 7) code to generate a binary discrimination output D1 corresponding to a recorded signal.

In the viterbi decoder 20, a PR (1, 1) equalization circuit 21 receives a digital playback signal DRF completing Nyquist equalization for conversion into digital data, generating a PR (1, 1) equalized signal SPR (1, 1) from the digital playback signal DRF. The PR (1, 1) equalization circuit 21 comprises a delay circuit for sequentially delaying the digital play back signal DRF supplied thereto sequentially by 1 clock period and an adder for adding an output of the delay circuit to the input to the delay circuit and outputting a result of addition as the PR (1, 1) equalized signal SPR (1, 1). In this way, the PR (1, 1) equalized signal SPR (1, 1) is generated by execution of (1+D) processing.

Figures 2A, 2B, 2C, 2D:
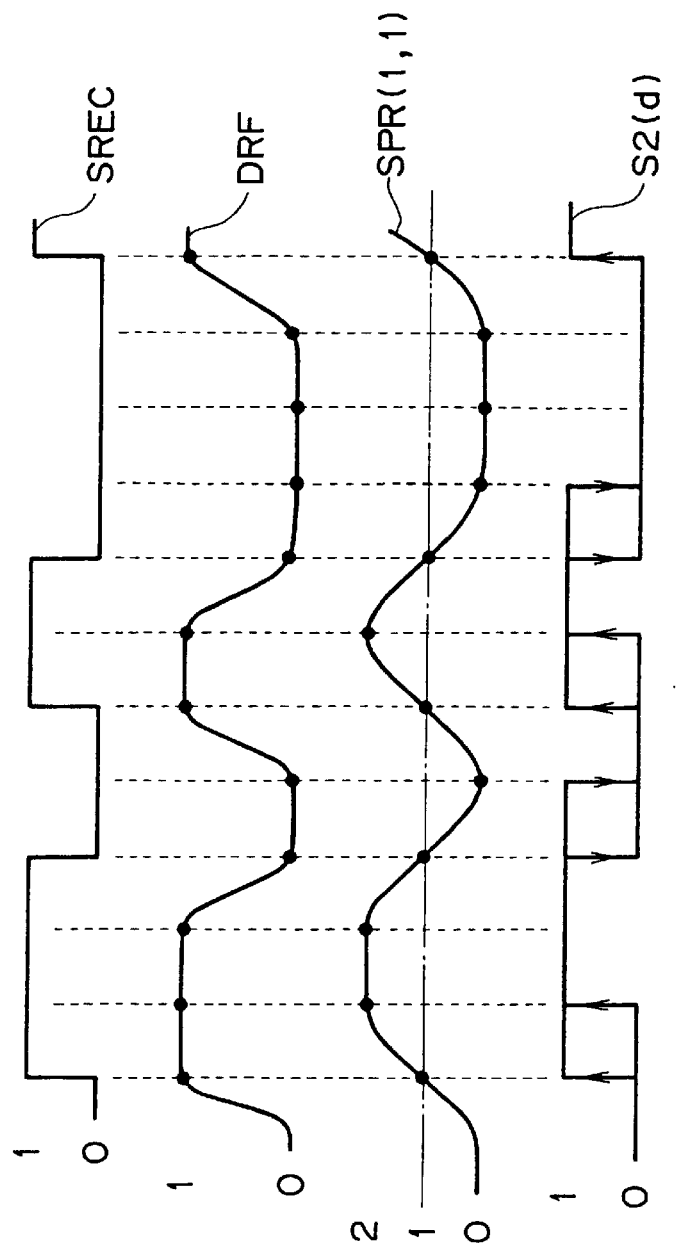
FIGS. 2A to 2D are diagrams showing waveforms of signals used for explaining tentative discrimination carried out in the viterbi decoder shown in FIG. 1.

A binary discrimination circuit 22 converts the PR (1, 1) equalized signal SPR (1, 1) into binary data by using an amplitude reference value of 1. FIGS. 2A to 2D are diagrams showing waveforms of signals observed before, during and after the pieces of processing carried out by the PR (1, 1) equalization circuit 21 and the binary discrimination circuit 22. To be more specific, FIG. 2A is a diagram showing the waveform of a recorded signal SREC having amplitude reference values of 0 and 1. FIG. 2B is a diagram showing the waveform of the playback signal DRF obtained as a result of carrying out Nyquist equalization on the recorded signal SREC. FIG. 2C is a diagram showing the waveform of the PR (1, 1) equalized signal SPR (1, 1) with amplitude reference values of 0, 1 and 2 output by the PR (1, 1) equalization circuit 21, that is, a signal resulting from PR (1, 1) equalization of the playback signal DRF into a PR (1, 1) equalized signal SPR (1, 1). Since RLL (1, 7) code is processed to generate the PR (1, 1) equalized signal SPR (1, 1), the PR (1, 1) equalized signal SPR (1, 1) has amplitude reference values of 0 and 2 before and after crossing an amplitude reference value of 1 respectively in the upward direction as shown in FIG. 2C. As a result, by having the binary discrimination circuit 22 convert the PR (1, 1) equalized signal SPR (1, 1) into binary data by using an amplitude reference value of 1, in the amplitude direction, it is possible to obtain a discrimination margin of $(2^{(1/2)})$ times the discrimination margin for a case in which the digital playback signal DRF obtained as a result of the Nyquist equalization is directly subjected to binary discrimination by the binary discrimination circuit 22.

In this embodiment, the binary discrimination circuit 22 carries out binary discrimination in accordance with conditions expressed by Eq. (3) given below on the PR (1, 1) equalized signal SPR (1, 1) which includes noise to generate a binary discrimination result signal S2 (d) shown in FIG. 2D. As described above, the PR (1, 1) equalized signal SPR (1, 1) is obtained as a result of the (1+D) processing carried out by the PR (1, 1) equalization circuit 21 on the digital playback signal DRF which has completed the Nyquist equalization.

For $Z(k) \geq 0$, $d=1$

For $Z(k) < 1$, $d=0$ (3)

where Z (k) is the PR (1, 1) equalized signal SPR (1, 1).

FIG. 2D is a diagram showing the waveform of the discrimination result signal S2 (d). As shown in FIG. 2D, the edges of the discrimination result signal S2 (d) may have the same phase or a phase delayed by 1 clock with respect to the corresponding edges of the recorded signal SREC shown in FIG. 2A due to a change in timing to cross the amplitude reference value of 1 caused by noise. Thus, the discrimination result signal S2 (d) is a result of discrimination that may include an error. As described earlier, however, in the amplitude direction, it is possible to obtain a discrimination margin of $(2^{(1/2)})$ times comparing to the discrimination margin for a case in which the digital playback signal DRF obtained as a result of the Nyquist equalization is directly subjected to binary discrimination by the binary discrimination circuit 22. In addition, in the phase direction, the discrimination margin is 2 times that of the conventional technique. As a result, except for the error of 1 clock on each edge of the discrimination result signal S2 (d), the recorded signal SREC is subjected to the discrimination process to generate a correct output. For this reason, in this embodiment, the playback signal RF is said to be subjected to a tentative discrimination process in the binary discrimination circuit 22, and a result of the tentative discrimination process allows the amount of computation to be reduced.

Figures 3A, 3B, 3C, 3D:
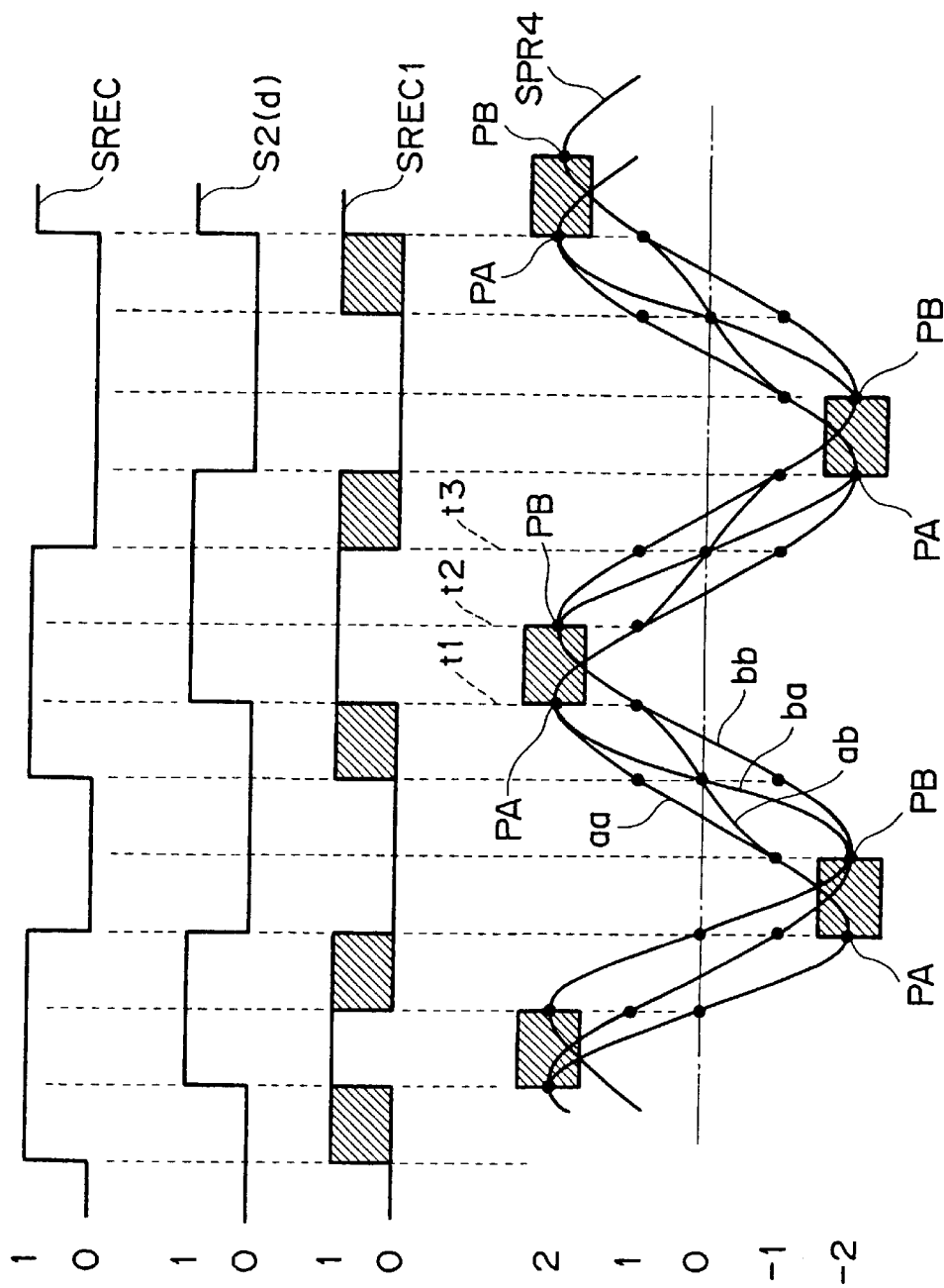
FIGS. 3A to 3D are diagrams showing relations between the tentative discrimination shown in FIG. 2 and an equalized signal.

FIG. 3A is a diagram showing the waveform of a typical recorded signal SREC and FIG. 3B is a diagram showing the waveform of a typical tentative discrimination result signal S2 [d]. As shown in these figures, the timing of an edge of the of the tentative discrimination result signal S2 [d] may be delayed by a 1-clock period with respect to the corresponding edge of the recorded signal SREC or just correct. The delayed timing and the correct timing are referred to hereafter as rear edge timing and front edge timing respectively. A recorded signal SRECI shown in FIG. 3C for a reference purpose is a signal which can be possibly obtained from the tentative discrimination result signal S2 [d] by inference. As shown in FIG. 3C, the inferred recorded signal SRECI has a waveform with uncertain edge timing.

Assume that the timing of a front edge is correct. In this case, a state shown in FIG. 7 corresponding to this front edge is S001 or S110 respectively providing values of 0 and 1 or 0 and −1 to an EPR4 equalized signal SPR4 shown in FIG. 3D, that is, a signal output by an EPR4 equalization circuit 23 shown in FIG. 1. For either provided output values, an output value of 2 or −2 is given at a sampling point following merging of 2 paths. The sampling point is referred to as timing of a rear edge.

By the same token, assume that the timing of a rear edge is correct. In this case, a state corresponding to this rear edge is S001 or S110 providing an output value of 2 or −2 respectively to the EPR4 equalized signal SPR4 at a subsequent sampling point following merging of 2 paths.

Figure 8:
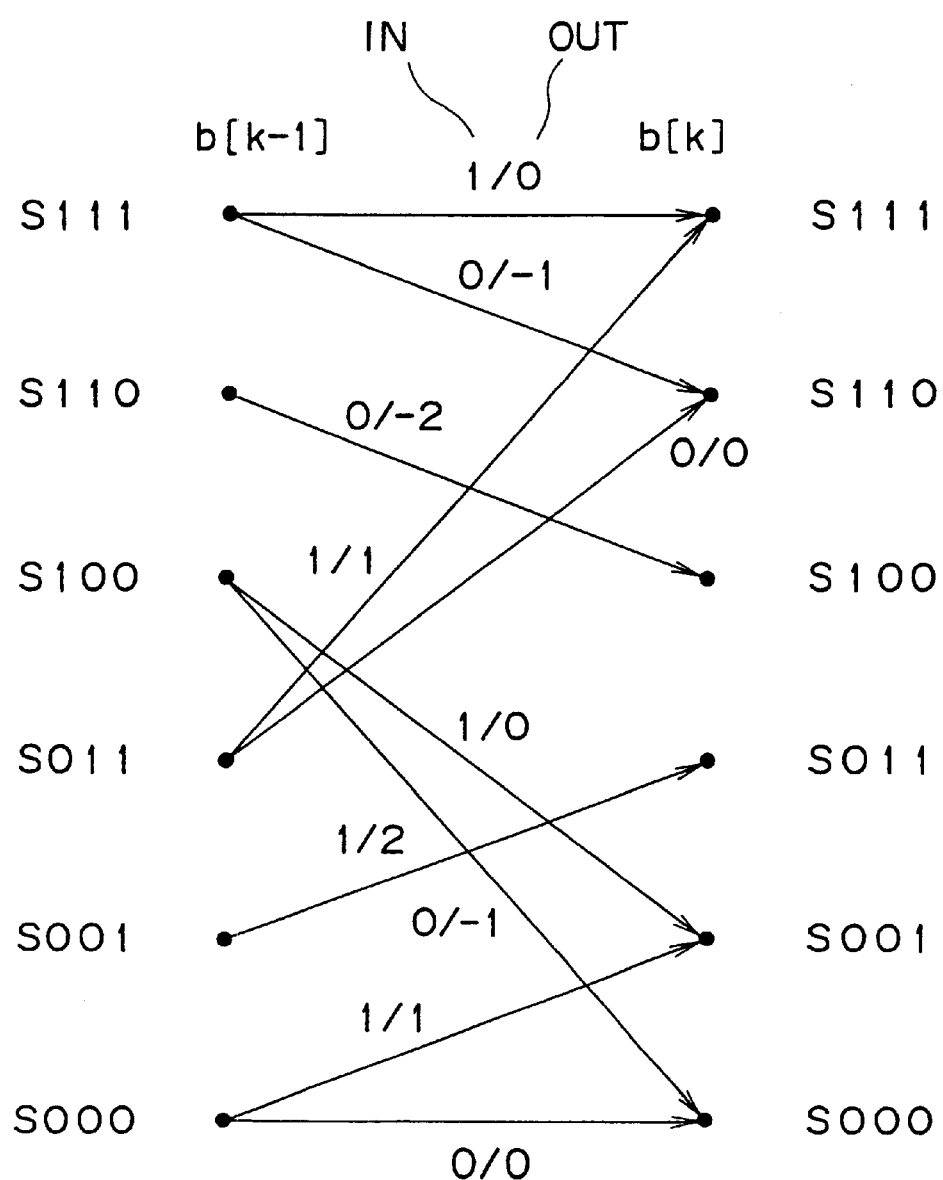
FIG. 8 is a trellis diagram of the state transitions shown in FIG. 7.

Thus, only for paths aa, ab, ba and bb connecting an amplitude reference value PA of 2 or −2 corresponding to a front edge to an amplitude reference value PB of 2 or −2 corresponding to a rear edge, are metrics computed and a judgment as to which edges provide a most probable discrimination result is formed. It should be noted that the paths aa, ab, ba and bb will be described more specifically later. Unlike the conventional viterbi decoding technique, a most probable path can thus be selected without computing metrics for all state transitions. As a result, in comparison with the conventional method, the overall configuration can be made simple to yet provide a correct decoding result. That is to say, in this embodiment, it is sufficient to carry out the processing, which is performed for the 6 states shown in FIG. 8 in the case of the conventional method, only for 4 states.

In addition, by virtue of the d=1 limitation, at a sampling point following a merged point of paths, paths are not merged. Thus, after a judgment on metrics is formed, processing to compute branch metrics, to add the branch metrics to previous metrics and to calculate of present metrics can be executed only once for every 2 sampling periods if necessary. As a result, even input data received at a high transfer speed can be processed with ease.

To put it concretely, if values of 0 and 0 or 1 and 1 appear successively in RLL (1, 7) code, that is, in the case of a discrimination result of 2T where T is a reference period, 3 paths exist between the amplitude reference values of 2 and −2. If more than 3 values of 0 or 1 appear in a row, 4 paths exist between the amplitude reference values of 2 and −2. Thus, viterbi decoding can be carried out on the code by computing metrics of paths of only up to 4 systems in formation of a judgment on paths based on the tentative discrimination described above with edge timing taken as a reference.

It should be noted that, in the following description, a path connecting an amplitude reference value corresponding to a front edge to an amplitude reference value corresponding to a front edge, a path connecting an amplitude reference value corresponding to a front edge to an amplitude reference value corresponding to a rear edge, a path connecting an amplitude reference value corresponding to a rear edge to an amplitude reference value corresponding to a front edge and a path connecting an amplitude reference value corresponding to a rear edge to an amplitude reference value corresponding to a rear edge are denoted by notations aa, ab, ba and bb respectively. Thus, the path aa is a path obtained on the assumption that advancing change points of the tentative discrimination result signal S2 by 1 clock period would provide a correct result and the path ab is a path obtained on the assumption that advancing a front change point of the tentative discrimination result signal S2 by 1 clock period would provide a correct result. On the other hand, the path ba is a path obtained on the assumption that advancing a rear change point of the tentative discrimination result signal S2 by 1 clock period would provide a correct result and the path bb is a path obtained on the assumption that change points of the tentative discrimination result signal S2 are correct.

The EPR4 equalization circuit 23 shown in FIG. 1 receives the PR (1, 1) equalized signal SPR (1, 1), delaying sampling values thereof sequentially by 2 clock periods. Then, the EPR4 equalization circuit 23 outputs a signal representing a difference between the delayed data and the data received sequentially. Thus, the EPR4 equalization circuit 23 carries out processing based on a processing formula of $(1-D^2)$ on the PR (1, 1) equalized signal SPR (1, 1), outputting an EPR4 equalized signal SPR4.

A state detecting circuit 24 shown in FIG. 1 outputs amplitude reference values THaa to THbb respectively for the 4 paths aa to bb described above corresponding to timing points of the continuous tentative discrimination result signal S2 from the tentative discrimination result signal S2. In addition, the state detecting circuit 24 also detects timing with which the paths aa to bb are merged, outputting a timing signal ST signaling the merge timing.

Figure 4:
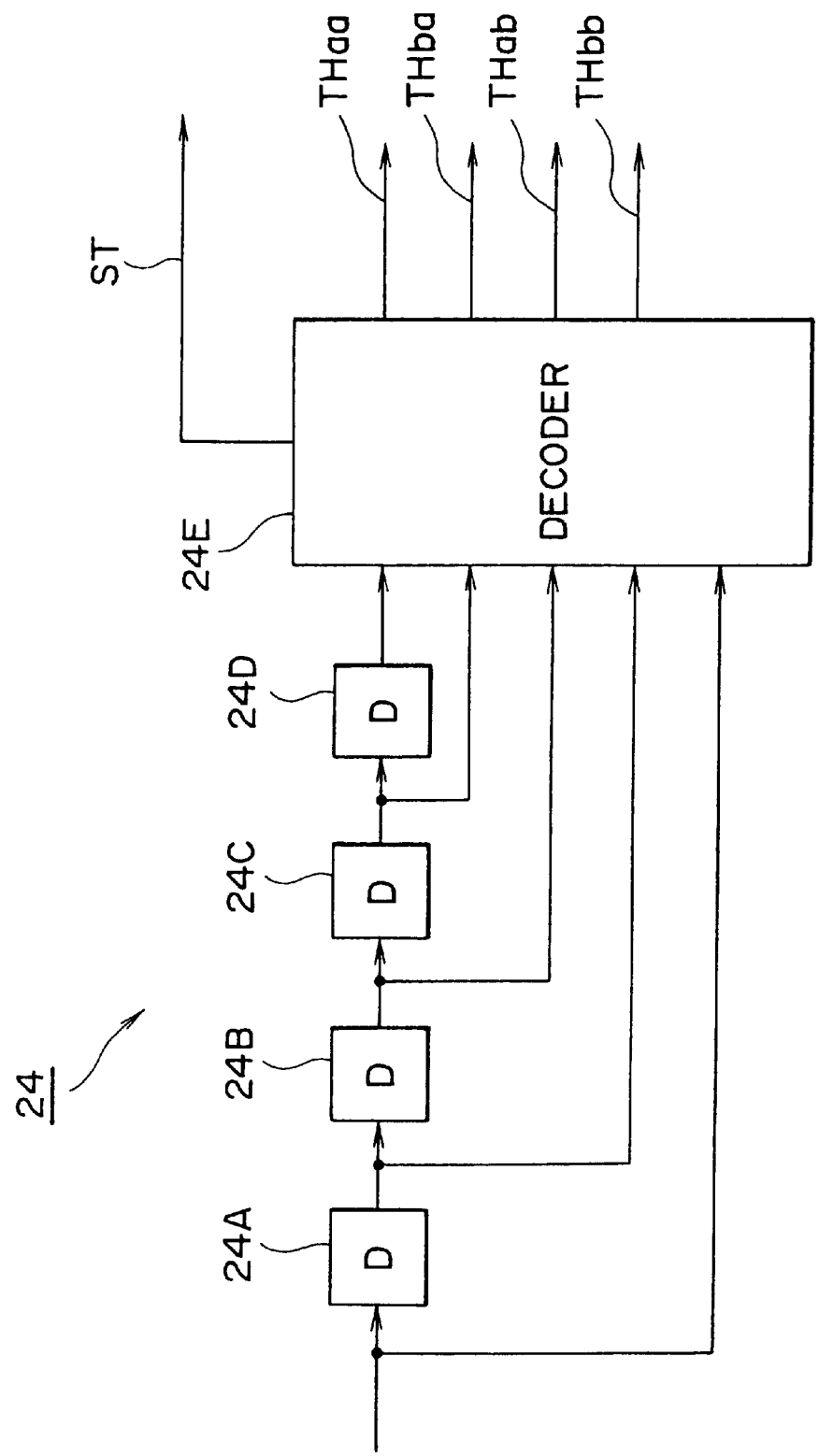
FIG. 4 is a block diagram showing the configuration of a state detecting circuit employed in the viterbi decoder shown in FIG. 1.

FIG. 4 is a block diagram showing the configuration of the state detecting circuit 24. As shown in the figure, the state detecting circuit 24 comprises 4 delay circuits (D) 24A to 24D which are connected to each other in series and a decoder 24E. The series circuit composed of the delay circuits 24A to 24D delays the tentative discrimination result signal S2 by a total of 4 clock periods sequentially. The decoder 24E made an access to a memory embedded therein at an address formed by 5 consecutive bits of the tentative discrimination result signal S2 output by the series circuit to output the timing signal ST and the amplitude reference values THaa to THbb for the 4 paths aa to bb respectively.

At points where the paths aa to bb are merged such as points of time t1 and t2 shown in FIG. 3, the state detecting circuit 24 outputs equal values for the amplitude reference values THaa to THbb associated with the merge points. To be more specific, at the point of time t1, amplitude reference values THaa and THab of 2 are output for the paths aa and ab respectively whereas amplitude reference values THba and THbb of 1 are output for the paths ba and bb respectively. At the point of time t2, on the other hand, amplitude reference values THba and THbb of 2 are output for the paths ba and bb respectively whereas amplitude reference values THaa and THab of 1 are output for the paths aa and ab respectively. Then, at a point of time t3, an amplitude reference value THaa of −1 is output for the path aa, amplitude reference values THab and THba of 0 are output for the paths ab and ba and an amplitude reference value THaa of 1 is output for the path bb.

A branch-metric computing circuit 25 shown in FIG. 1 sequentially computes and outputs branch metrics Maa to Mbb of the EPR4 equalized signal SPR4 from the amplitude reference values THaa to THbb. The branch-metric computing circuit 25 comprises 4 subtraction circuits for the amplitude reference values THaa to THbb respectively and squaring circuits. The 4 subtraction circuits each find a difference between the respective amplitude reference value and the EPR4 equalized signal SPR4. On the other hand, the squaring circuits each compute the square of the difference found by the associated subtraction circuit to output the branch metrics Maa to Mbb.

A branch-metric processing circuit 26 shown in FIG. 1 comprises a first branch-metric processing unit 26A for the 2 paths aa and ba associated with a front edge and a second branch-metric processing unit 26B for the 2 paths ab and bb associated with a rear edge. To put it in detail, the branch-metric processing circuit 26 comprises the first branch-metric processing unit 26A for the 2 paths aa and ba merged at a sampling point corresponding to a front edge and the second branch-metric processing unit 26B for the 2 paths ab and bb merged at a sampling point corresponding to a rear edge. The branch-metric units 26A and 26B compute metrics for their respective paths in order to select a most probable path.

Figure 5:
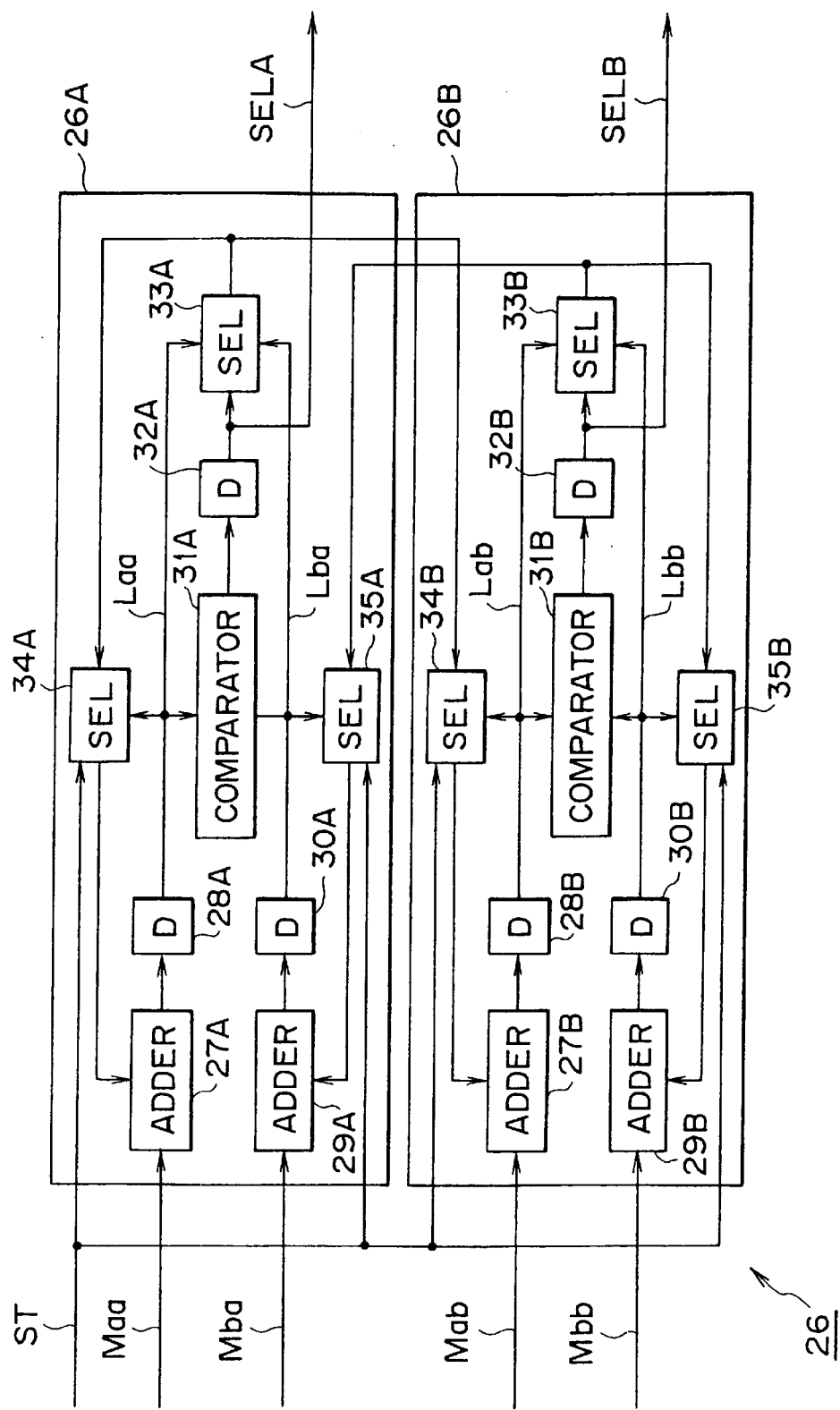
FIG. 5 is a block diagram showing the configuration of the branch-metric processing circuit employed in the viterbi decoder shown in FIG. 1.

FIG. 5 is a block diagram showing the configuration of the branch-metric processing circuit 26. As shown in the figure, in the first branch-metric processing unit 26A, the branch metric Maa of the path aa is supplied to an adder 27A to be added to a metric of the path aa preceding the branch metric Maa by 1 sample period. A delay circuit (D) 28A is used for latching the result of the addition produced by the adder 27A.

On the other hand, the branch metric Mba of the path ba is supplied to an adder 29A to be added to a metric of the path ba preceding the branch metric Mba by 1 sample period. A delay circuit (D) 30A is used for latching the result of the addition produced by the adder 29A. A comparator 31A compares signals output by the latches 28A and 30A to find the smaller one between metrics of the paths aa and ba.

A delay circuit (D) 32A is used for latching and holding a result of the comparison by the comparator 31A. A selector 33A selects either the metric held by the latch 28A or a metric held by the latch 30A in accordance with the result of the comparison held in the latch 32A. In this way, a path is then created after the merge point corresponding to the front edge as has been described by referring to FIG. 3 and a common branch metric is added to metrics for the 2 paths aa and ba.

Thus, in this embodiment, by merely comparing metrics computed for the paths aa and ba using the comparator 31A and selecting one of the metrics by using the selector 33A after holding temporarily the metrics in the latches 28A and 30A, that is, by merely determining a subsequent metric in accordance with a result of comparison of metrics preceding the subsequent metric by only 1 clock period, a correct metric required for computation of a subsequent metric can be selected.

To put it in detail, a selector 34A employed in the first branch-metric processing unit 26A selects a metric at a merge point with timing determined by the timing signal ST in accordance with a result of comparison of metrics done at a point of time preceding the amplitude reference values of 2 and −2 corresponding to a front edge, that is, the point of time t1 shown in FIG. 3, by 1 clock period. The metric selected by the selector 34A is either a metric selected by the selector 33A or a metric stored in the latch 28A. The selected metric is supplied to the adder 27A, the output of which is used for finally replacing the metric held in the latch 28A.

Likewise, a selector 35A employed in the first branch-metric processing unit 26A selects a metric at a timing point corresponding to a front edge with timing determined by the timing signal ST in accordance with a result of comparison of metrics done with the same timing. The metric selected by the selector 35A is a metric selected by a selector 33B employed in the second branch-metric processing unit 26B or a metric stored in the latch 30A. The selected metric is supplied to the adder 29A, the output of which is used for finally replacing the metric held in the latch 30A. Thus, in the first branch-metric processing unit 26A, in 2 clock periods, after metrics for the 2 paths aa and ba are computed, a result of comparison is obtained to find a subsequent metric.

By the same token, in the second branch-metric processing unit 26B, the branch metric Mab of the path ab is supplied to an adder 27B to be added to a metric of the path ab preceding the branch metric Mab by 1 sample period. A delay circuit (D) 28B is used for latching the result of the addition produced by the adder 27B.

On the other hand, the branch metric Mbb of the path bb is supplied to an adder 29B to be added to a metric of the path bb preceding the branch metric Mbb by 1 sample period. A delay circuit (D) 30B is used for latching the result of the addition produced by the adder 29B. A comparator 31B compares signals output by the latches 28B and 30B to find the smaller one between metrics of the paths ab and bb.

A delay circuit (D) 32B is used for latching and holding a result of the comparison by the comparator 31B. The selector 33B selects the metric held by the latch 28B or a metric held by the latch 30B in accordance with the result of the comparison held in the latch 32B. In this way, a path to a rear edge is then created after the merge point for the paths ab and bb and, at a sampling point following the merge point, a common branch metric is added to metrics for the 2 paths ab and bb.

Thus, a selector 34B employed in the second branch-metric processing unit 26B selects a metric with timing corresponding to a rear edge, that is, with timing determined by the timing signal ST, in accordance with a result of comparison of metrics done at a point of time preceding the amplitude reference values of 2 and −2 corresponding to the rear edge, that is, the point of time t2 shown in FIG. 3, by 1 clock period. The metric selected by the selector 34B is a metric selected by the selector 33A employed in the first branch-metric processing unit 26A or a metric stored in the latch 28B. The selected metric is supplied to the adder 27B, the output of which is used for finally replacing the metric held in the latch 28B. Thus, a subsequent metric is selected in accordance with a result of comparison of metrics preceding the subsequent metric by 1 clock period only.

Likewise, a selector 35B employed in the second branch-metric processing unit 26B selects a metric at a timing point corresponding to a rear edge with timing determined by the timing signal ST in a similar way. The metric selected by the selector 35B is a metric selected by the selector 33B or a metric stored in the latch 30B. The selected metric is supplied to the adder 29B, the output of which is used for finally replacing the metric held in the latch 30B. Thus, also in the second branch-metric processing unit 26B, in 2 clock periods, after metrics for the 2 paths ab and bb are computed, a result of comparison is obtained to find a metric at a merge point.

The results of comparison held in the latches 32A and 32B employed in the branch-metric processing circuit 26 are output as select signals SELA and SELB.

The first and second shift registers 40A and 40B shown in FIG. 1 constitute a path memory unit and are driven by the select signals SELA and SELB respectively. The first and second shift registers 40A and 40B shift history data held by themselves or held by the other shift registers 40B and 40A respectively in accordance with the select signals SELA and SELB, generating a binary discrimination output D1.

Figure 6:
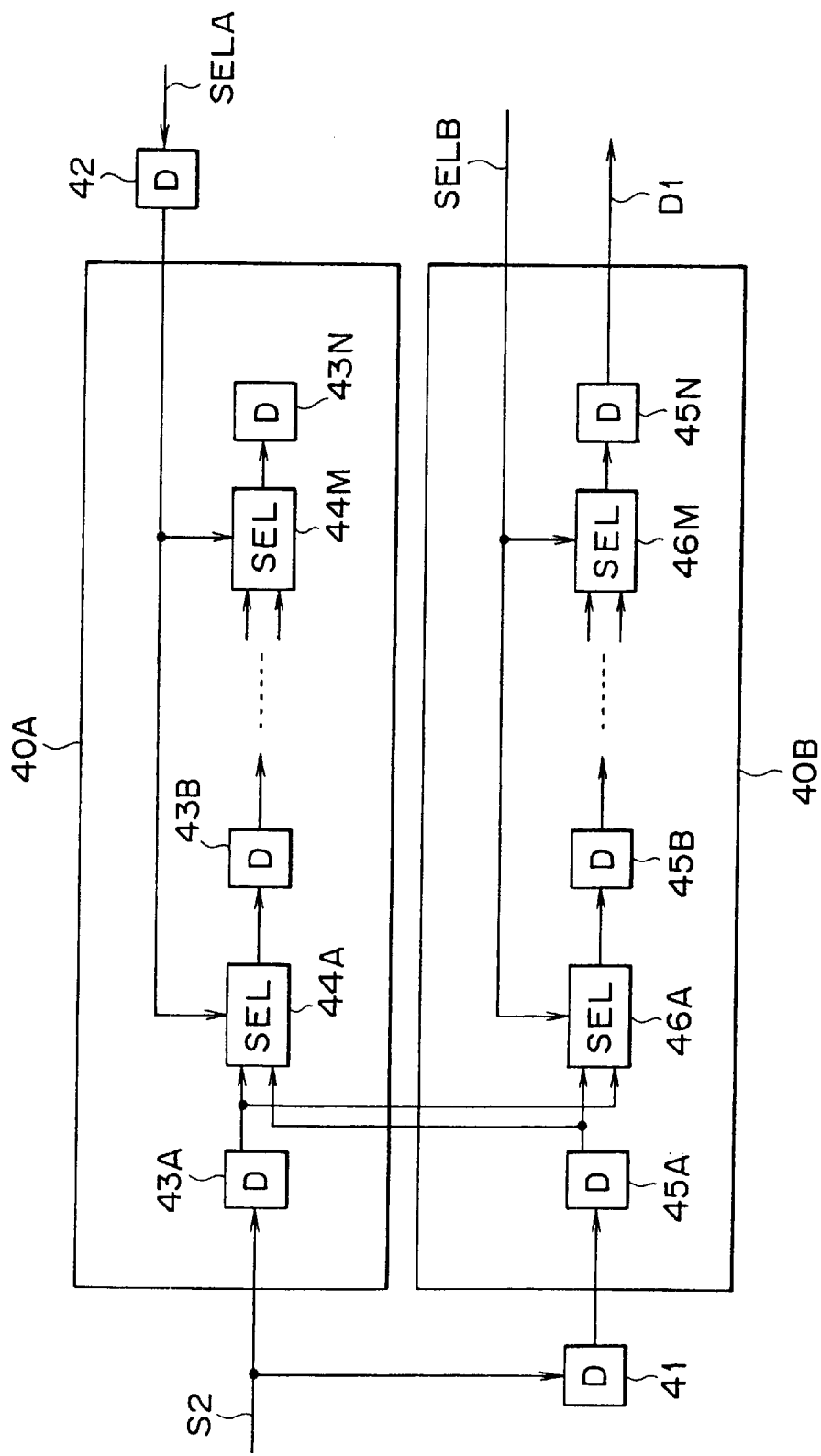
FIG. 6 is a block diagram showing the configurations of shift registers employed in the viterbi decoder shown in FIG. 1.

FIG. 6 is a block diagram showing the configurations of the first and second shift registers 40A and 40B. As shown in the figure, the first shift register 40A comprises latches (D) 43A to 43N at a predetermined number of stages for holding a history. Except for the latch 43A at the first stage, the latches 43B to 43N are provided with selectors 44A to 44M respectively at the inputs thereof for selecting history input data to be supplied to the latches 43B to 43N. The latch 43A employed in the first shift register 40A at the first stage receives the tentative discrimination result signal S2. Contact points of the selectors 44A to 44M employed in the first shift register 40A are switched over by the select signal SELA which is supplied to the shift register 40A by way of a delay circuit (D) 42 for timing correction. The selectors 44A to 44M thereby select a history of its own held in the latches 43A to 43M provided in front of the selectors 44A to 44M respectively or a history held in the corresponding latches 45A to 45M employed in the second shift register 40B in conformity with selection of a path in the first branch-metric processing unit 26A, supplying the selected history to the subsequent latches 43B to 43N.

By the same token, the second shift register 40B comprises latches (D) 45A to 45N at a predetermined number of stages for holding a history. Except for the latch 45A at the first stage, the latches 45B to 45N are provided with selectors 46A to 46M respectively at the inputs thereof for selecting history input data to be supplied to the latches 45B to 45N. The latch 45A employed in the second shift register 40B at the first stage receives the tentative discrimination result signal S2 by way of a delay circuit (D) 41 for timing correction. Contact points of the selectors 46A to 46M employed in the second shift register 40B are switched over in synchronization with the switching-over of the selectors 44A to 44M employed in the first shift register 40A by the select signal SELB which is supplied to the shift register 40B. The selectors 46A to 46M thereby select a history of its own held in the latches 45A to 45M provided in front of the selectors 46A to 46M respectively or a history held in the corresponding latches 43A to 43M employed in the first shift register 40A in conformity with selection of a path in the second branch-metric processing unit 26B, supplying the selected history to the subsequent latches 45B to 45N.

As described above, the first and second shift registers 40A and 40B comprise the latches 43A to 43N and 45A to 45N as well as the selectors 44A to 44M and 46A to 46M respectively at a predetermined number of stages. History data stored in latches after a certain number of stages is common to both the first and second shift registers 40A and 40B.

Figure 9:
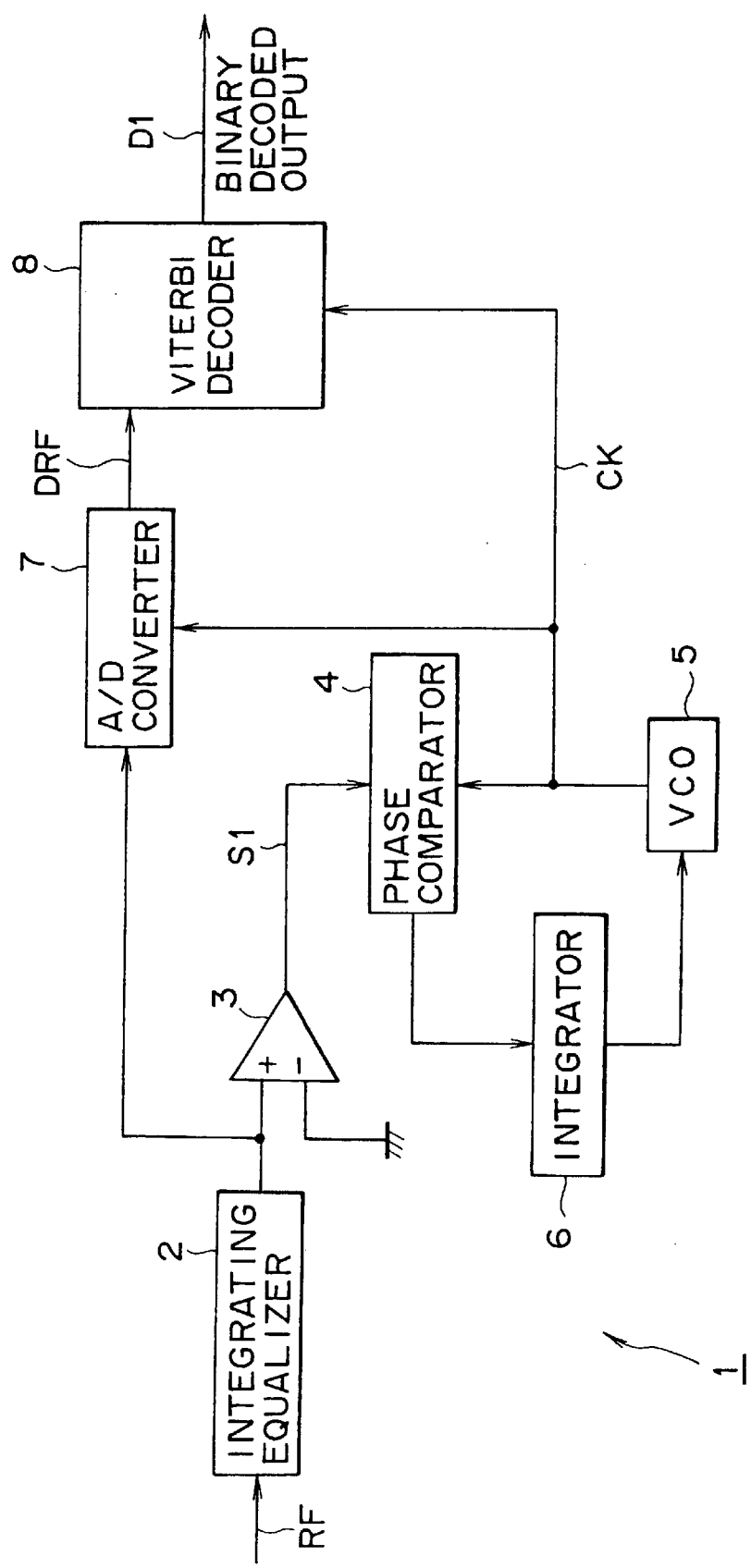
FIG. 9 is a block diagram showing an overall configuration of a playback signal processing system employed in a video tape recorder.
Figure 10:
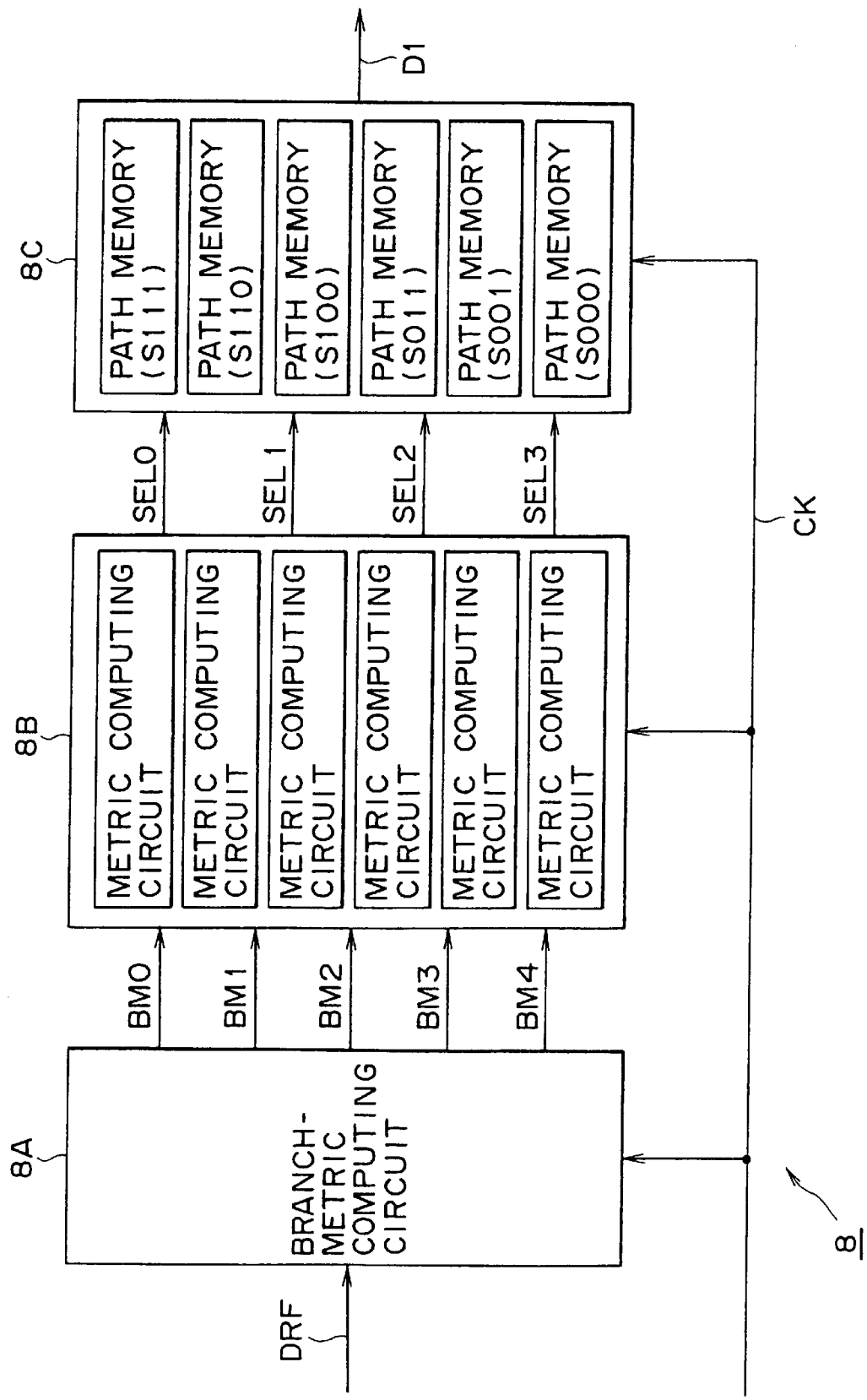
FIG. 10 is a block diagram showing the conventional viterbi decoder.
Figure 12A:
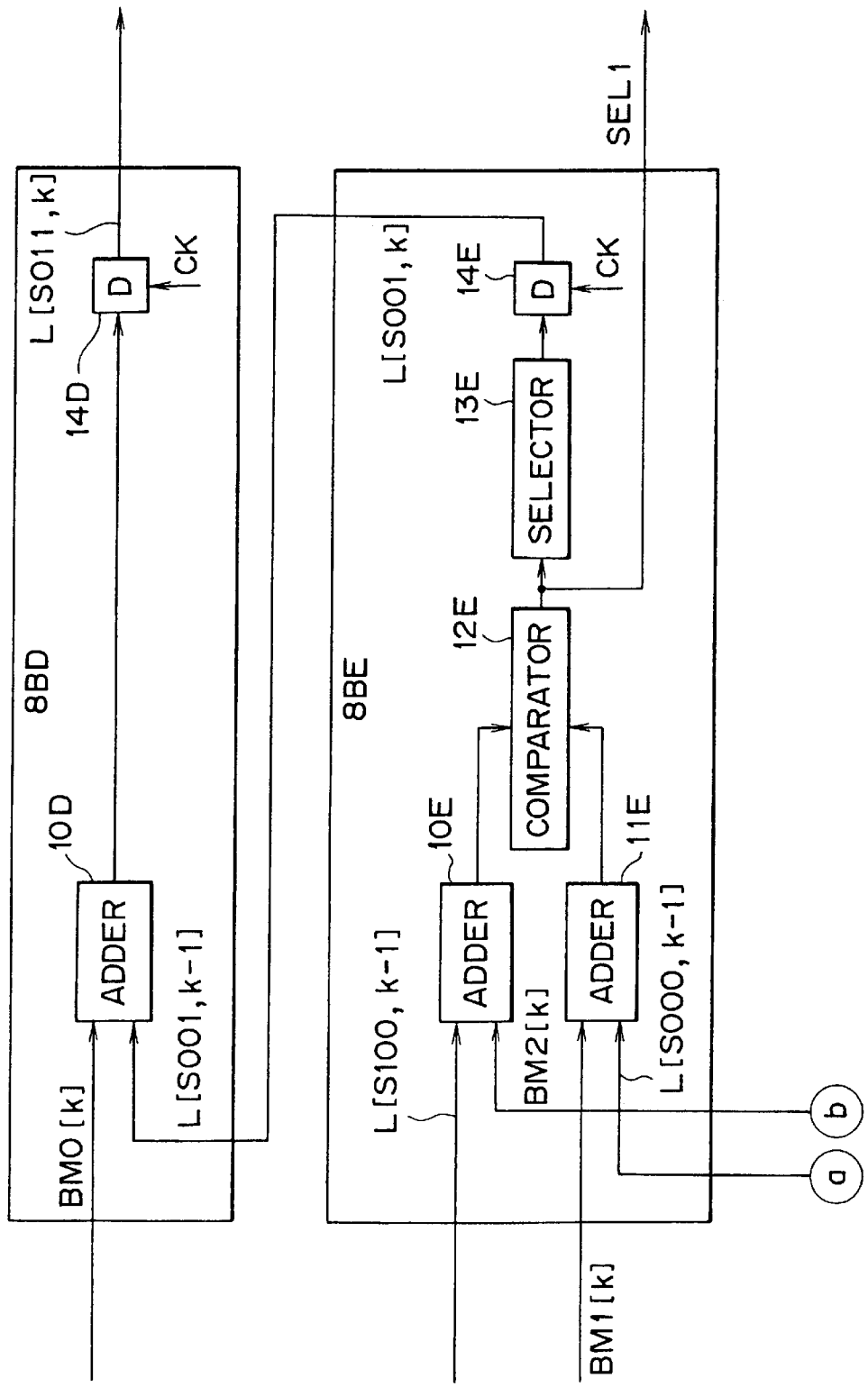
FIG. 12 is a block diagram showing a continuation of FIG. 11.
Figure 13:
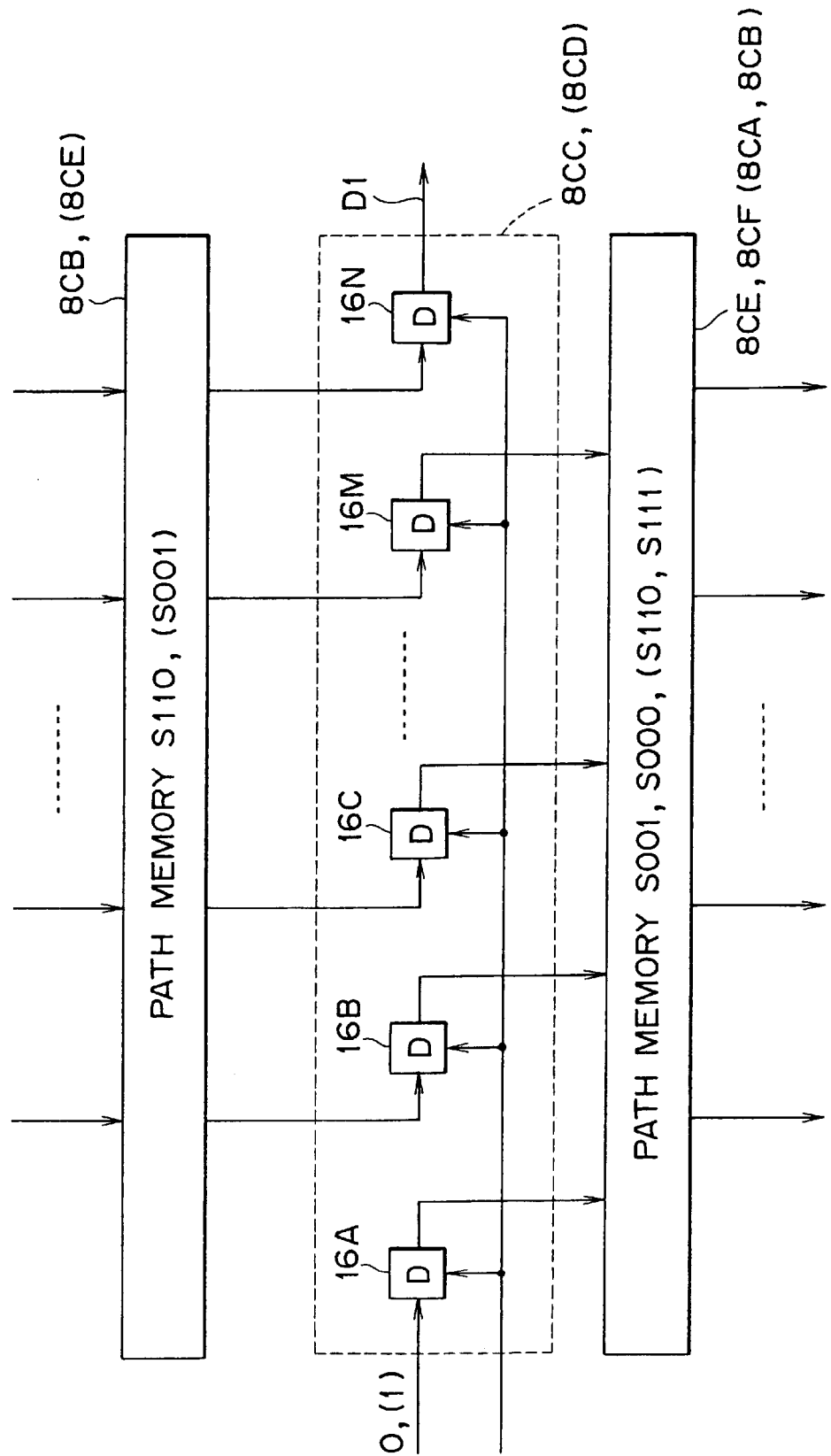
FIG. 13 is a block diagram showing the configuration of a path memory shown in FIG. 10.
Figure 14:
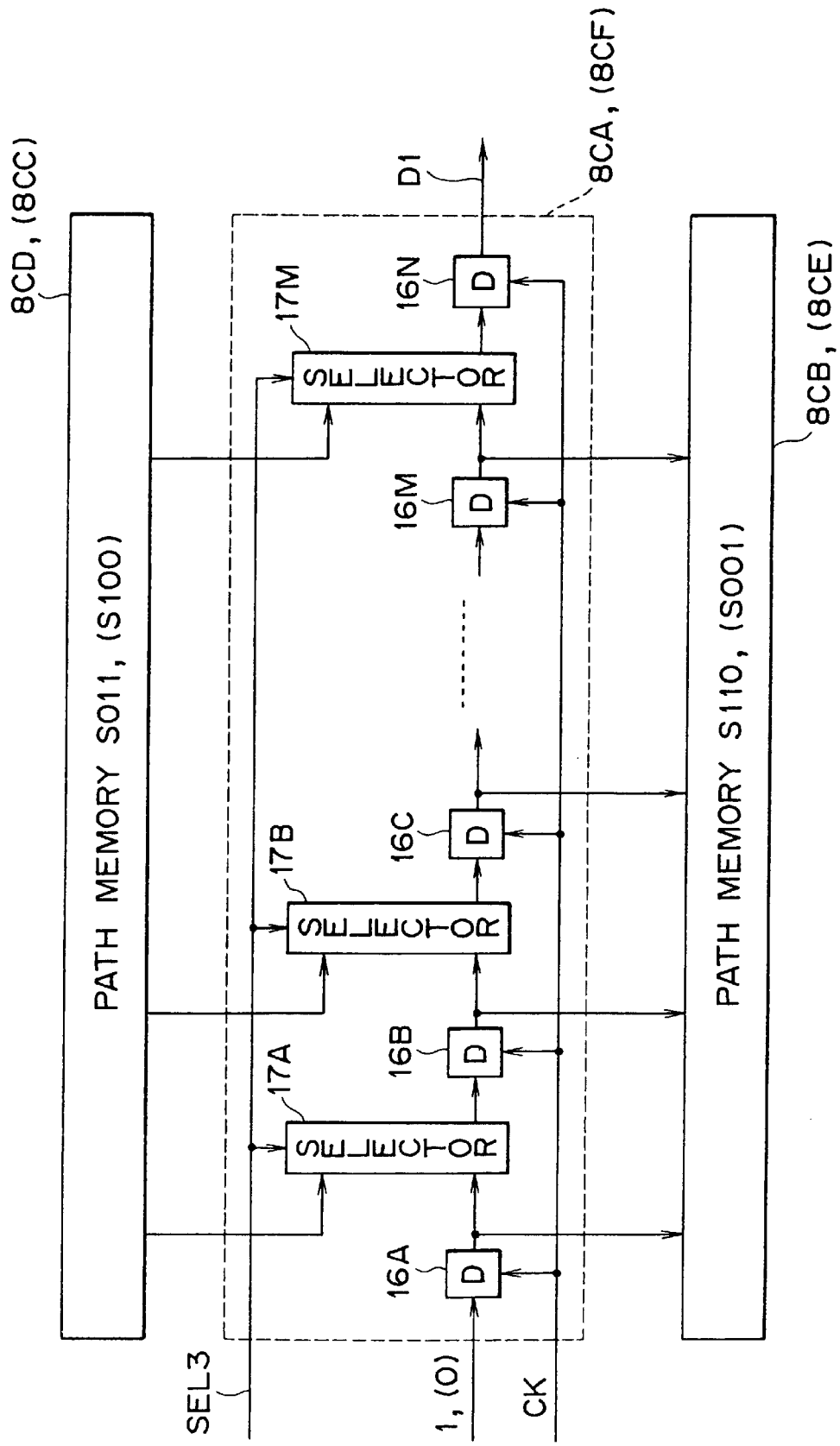
FIG. 14 is a block diagram showing the configuration of another path memory shown in FIG. 10.
Figure 15:
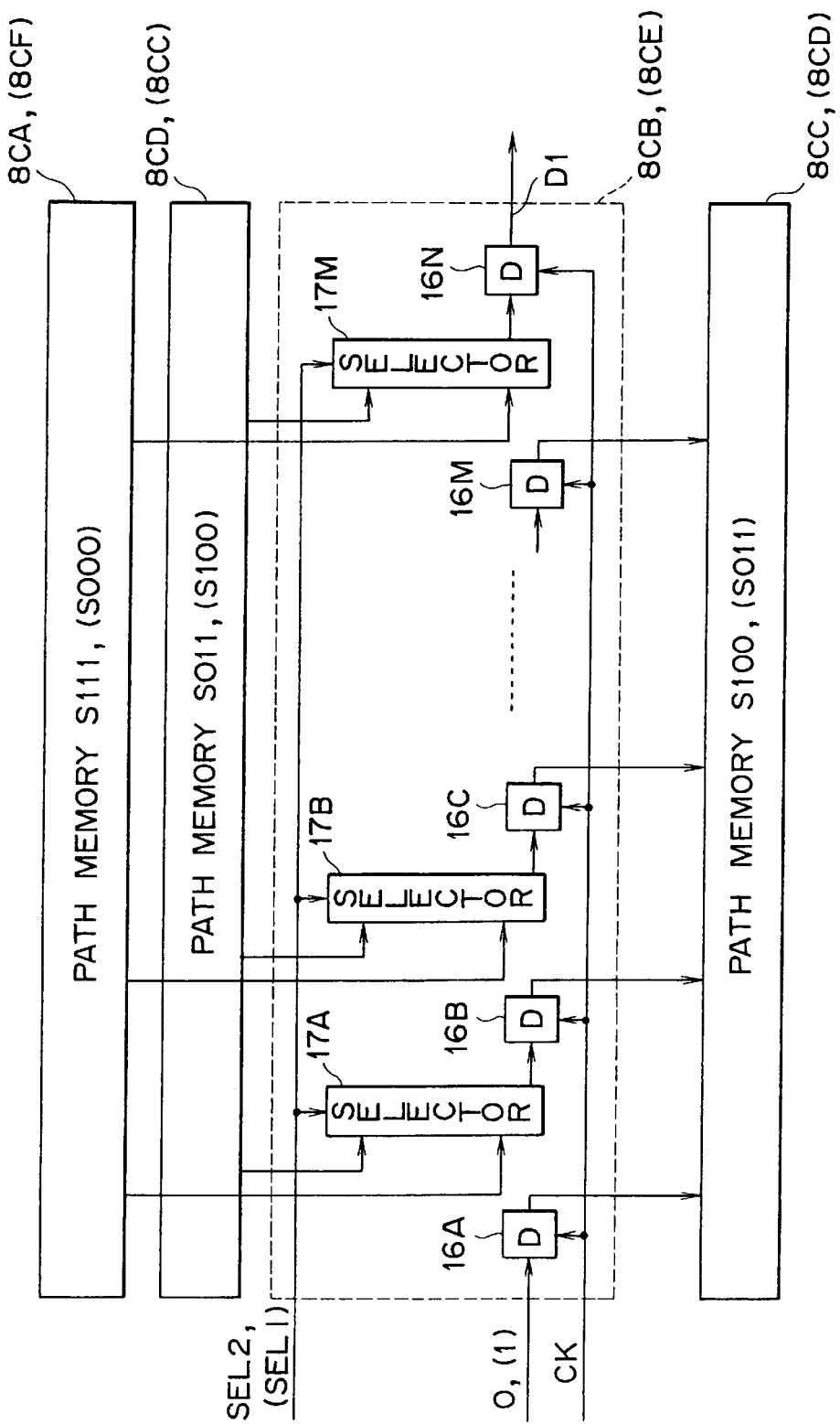
FIG. 15 is a block diagram showing the configuration of a still another path memory shown in FIG. 10.

In the configuration of FIG. 9 described earlier, a playback signal RF obtained through a magnetic head is subjected to Nyquist equalization in the integrating equalizer 2 before undergoing binary conversion in the comparison circuit 3. A binary signal obtained as a result of the binary conversion is used by the phase comparator 4, the VCO 5 and the integrator 6 for generating a clock signal CK which is used to drive the A/D converter 7 for converting an analog signal output by the integrating equalizer 2 into a digital playback signal DRF. In the present embodiment, the digital playback signal DRF is supplied to the viterbi decoder 20.

In the viterbi decoder 20 shown in FIG. 1, the digital playback signal DRF shown in FIG. 2B which has been generated from a recorded signal SREC shown in FIG. 2A as described above is subjected to equalization conforming to a PR (1, 1) characteristic in the PR (1, 1) equalization circuit 21, being converted into a PR (1, 1) equalized signal SPR (1, 1) shown in FIG. 2C. After the DRF signal has been converted into the PR (1, 1) equalized signal SPR (1, 1) having a sufficient discrimination margin, the PR (1, 1) equalized signal SPR (1, 1) with amplitude reference values of 0, 1 and 2 is subjected to binary conversion with an amplitude reference value of 1 used as a reference in the binary discrimination circuit 22 to generate a tentative discrimination result signal S2 shown in FIG. 2D.

The tentative discrimination result signal S2 shown in FIG. 3B is obtained as a result of binary conversion of the PR (1, 1) equalized signal SPR (1, 1) with a sufficient discrimination margin, that is, at amplitude reference values in the range 0 to 2. In addition, the recorded signal SREC of FIG. 3A from which the playback signal RF is reproduced is generated from RLL (1, 7) code obtained as a result of coding with the d=1 limitation. As a result, the recorded signal SREC can be discriminated correctly except that an error of 1 clock period exists in edge timing.

Thus, in the state detecting circuit 24 shown in FIG. 4, the tentative discrimination result signal S2 is transferred through the delay circuits 24A to 24D sequentially. 5 bits, that is, the bit of the tentative discrimination result signal S2 and 4 bits output by the delay circuits 24A and 24D are supplied to the decoder 24E as parallel data to generate amplitude reference values THaa to THbb of 2, 1, 0, −1 or −2 for the paths aa to bb shown in FIG. 3D respectively and a timing signal ST corresponding to a merge point of the paths aa to bb. It should be noted that the paths aa to bb are paths of 4 systems that can be possibly taken by the digital playback signal DRF.

Thus, in the viterbi decoder 20, viterbi decoding is carried out by sequentially computing metrics for only 4 paths, a relatively small number of paths in comparison with a total of 6 states that can be possibly taken by the digital playback signal DRF.

To put it in detail, in the viterbi decoder 20 shown in FIG. 1, the PR (1, 1) equalized signal SPR (1, 1) is further equalized by an EPR4 equalization circuit 23, being converted into an EPR4 equalized signal SPR4 with amplitude reference values of 2, 1, 0, −1 and −2. The EPR4 equalized signal SPR4 is supplied to a branch-metric computing circuit 25.

In the branch-metric computing circuit 25, differences between the EPR4 equalized signal SPR4 and the amplitude reference values THaa to THbb computed by the state detecting circuit 24 for the paths aa to bb respectively are calculated and the squares of the differences are found to produce branch metrics Maa to Mbb for the paths aa to bb respectively.

In the first branch-metric processing circuit 26A shown in FIG. 5, the branch metrics Maa and Mba corresponding to a front edge are added to previous metrics for the paths aa and ba selected by the selectors 34A and 35A for the paths aa and ba respectively to compute metrics Laa and Lba at the following sampling point. After being stored once in the latches 28A and 30A respectively, the metrics Laa and Lba are compared with each other by the comparator 31A. A result of the comparison is supplied to the selector 33A by way of the latch 32A for selecting one of the metrics Laa and Lba which has a smaller value, that is, a metric for a more probable path.

A metric selected by the selector 33A on the basis of a result of comparison supplied thereto by way of the latch 32A is a metric at a merge point of the 2 paths aa and ba. The metric is supplied to the adder 27A by way of the selector 34A and the adder 27B corresponding to the adder 27A in the second branch-metric processing unit 26B by way of the selector 34B. Thus, the metric supplied to the adders 27A and 27B is a metric selected in accordance with a result of comparison of metrics obtained at a point of time preceding the timing of the amplitude reference values of 2 and −2 corresponding to a front edge by only 1 clock period. As a result, as a whole, processing to compute, compare and update metrics is executed in 2 sampling periods. For this reason, processing to compute metrics can be executed also for a playback signal RF generated at a high transfer rate.

By the same token, in the second branch-metric processing circuit 26B, the branch metrics Mba and Mbb corresponding to a rear edge are added to previous metrics for the paths ba and bb selected by the selectors 34B and 35B for the paths ba and bb respectively to compute metrics Lba and Lbb at the following sampling point. After being stored once in the latches 28B and 30B respectively, the metrics Lba and Lbb are compared with each other by the comparator 31B. A result of the comparison is supplied to the selector 33B by way of the latch 32B for selecting one of the metrics Lba and Lbb which has a smaller value, that is, a metric for a more probable path.

A metric selected by the selector 33B on the basis of a result of comparison supplied thereto by way of the latch 32B is a metric at a merge point of the 2 paths ab and bb. The metric is supplied to the adder 29B by way of the selector 35B and the adder 29A corresponding to the adder 29B in the first branch-metric processing unit 26A by way of the selector 35A. Thus, the metric supplied to the adders 29B and 29A is a metric selected in accordance with a result of comparison of metrics obtained at a point of time preceding the timing of the amplitude reference values of 2 and −2 corresponding to a rear edge by only 1 clock period. As a result, as a whole, processing to compute, compare and update metrics is executed in 2 sampling periods. For this reason, processing to compute metrics can be executed also for a playback signal RF generated at a high transfer rate with a high degree of reliability.

The results of the comparisons of metrics by the comparators 31A and 31B described above are output to the first and second shift registers 40A and 40B which constitute a path memory unit as select signals SELA and SELB respectively.

As shown in FIG. 6, the tentative discrimination result S2 is supplied directly to the first shift register 40A and the second shift register 40B by way of the delay circuit 41 for compensating for a difference in timing equal to an error of 1 clock period between the first and second branch-metric processing units 26A and 26B. The tentative discrimination result S2 is transferred through a series circuit comprising the latches 43A to 43N and the selectors 44A to 44M arranged alternately in the first shift register 40A and a series circuit comprising the latches 45A to 45N and the selectors 46A to 46M arranged alternately in the second shift register 40B. The select signal SELA drives the selectors 44A to 44M to select bits from the latches 43A to 43M or bits from the selectors 45A to 45M respectively. By the same token, the select signal SELB drives the selectors 46A to 46M to select bits from the latches 45A to 45M or bits from the selectors 43A to 43M respectively. As the tentative discrimination result signal S2 is transferred through a predetermined number of latch stages, the latches 43A to 43N and the latches 45A to 45N are set at values equal to those obtained as a result of discriminating the recorded signal SREC according to the route of a path in the digital playback signal DRF. Thus, in the viterbi decoder 20, metrics for 4 states corresponding to an error of 1 clock period are judged and history data is stored in the first and second shift registers 40A and 40B for front and rear edges respectively corresponding to this error of 1 clock period. As a result, discrimination can be carried out at a high speed and by a simple configuration.

According to the configuration described above, the digital playback signal DRF is equalized to produce a PR (1, 1) equalized signal SPR (1, 1) which is then subjected to tentative discrimination to generate a tentative discrimination result signal S2, a binary signal. By using edges of the binary signal obtained as a result of the tentative discrimination as a reference, the number of paths that the digital playback signal DRF can take is limited in processing metrics. Thus, in order to apply viterbi decoding to the digital playback signal DRF, metrics need to be processed only for a small number of state transitions in comparison with a viterbi decoder having the conventional configuration in which the number of paths is not limited whatsoever. As a result, viterbi decoding can be performed by using a simple configuration.

In addition, history data of this binary signal is transferred through the first and second shift registers 40A and 40B with timing corresponding to front and rear edges respectively and, at the same time, the data may be cross-transferred between the first and second shift registers 40A and 40B in dependence on a result of a judgment on metrics. Thus, viterbi decoding can be performed by using shift registers of only 2 systems. As a result, viterbi decoding can be performed by using a simple configuration accordingly.

Furthermore, a metric of timing corresponding to a merge point is selected in accordance with a result of a judgment on metrics formed with timing preceding the merge point corresponding to a front or rear edge by 1 clock period in order to compute a subsequent metric. Thus, processing to compute, compare and select metrics can be executed in 2 clock periods. As a result, a playback signal RF generated at a high transfer rate can therefore be decoded with a high degree of reliability.

As described above, in the embodiment, a square of the signal level of a difference from an amplitude reference value is computed. It should be noted, however that the description is not intended to be construed in a limiting sense. That is to say, the scope of the present invention is not limited to the embodiment. For example, the present invention can also be applied to a case in which a metric is computed directly from a difference itself.

In addition, in the embodiment described above, by performing PR (1, 1) equalization on RLL (1, 7) code limited by the d=1 restriction, the amplitude reference values can be set at 0, 1 and 2 to increase a discrimination margin of tentative discrimination. It is worth noting, however, that the scope of the present invention is not limited to the embodiment. For example, the present invention can also be applied to tentative discrimination to increase a discrimination margin by using a variety of equalization techniques and tentative discrimination wherein this equalization is eliminated in dependence on the characteristic of a transmission system.

Furthermore, in the embodiment described above, by applying RLL (1, 7) code limited by the d=1 restriction, paths are not merged after a merge point corresponding to an edge so as to limit the number of state transitions that can possibly be experienced by the equalized signal SPR4. It should be noted, however, that the scope of the present invention is not limited to the embodiment. For example, the present invention can also be applied to a broad range of encoding techniques with a shortest wavelength of at least 2T where T is a reference period such as EFM (eight to fourteen modulation) in place of the RLL (1, 7) encoding.

On the top of that, in the embodiment described above, a path memory unit comprises shift registers of 2 systems associated with front and rear edges respectively for latching the tentative discrimination result signal S2 one bit after another. It is worth noting, however, that the scope of the present invention is not limited to the embodiment. For example, the present invention can also be applied to a case in which a path memory unit comprises shift registers for 4 paths to be judged by the branch-metric processing circuit 26 by transferring data having a fixed value in place of the tentative discrimination result signal S2.

In addition, in the embodiment described above, a playback signal is discriminated by EPR4 equalization. It should be noted, however, that the scope of the present invention is not limited to the embodiment. For example, the present invention can also be widely applied to cases in which a playback signal is discriminated by a variety of equalization techniques such as EEPR (Extended Extended Partial Response) 4.

Furthermore, in the embodiment described above, the present invention is applied to a video tape recorder for decoding a magnetically recorded signal. It is worth noting, however, that the scope of the present invention is not limited to the embodiment. For example, the present invention can also be applied to optical recording in an optical-disc apparatus and a broad range of applications such as communication of various kinds of information.

EFFECTS OF THE INVENTION

As described above, according to the present invention, viterbi decoding can be carried out on a digital signal by using a simple configuration through the steps of:

carrying out tentative discrimination on an input signal;

equalizing the input signal in accordance with a result of the tentative discrimination;

limiting the number of state transitions of the equalized signal; and forming a judgment to select a most probable state transition among the limited number of state transitions.

What is claimed is:

1. A digital-signal playback apparatus comprising:

a tentative discrimination means for carrying out tentative discrimination on an input signal at a predetermined sampling period according to an amplitude reference signal to output a binary signal with the same change-point timing as a correct result of said tentative discrimination or with change-point timing delayed by 1 clock period with respect to said correct result of said tentative discrimination;

an equalization means for carrying out equalization on said input signal to output an equalized signal; and a judgment means for discriminating said input signal by designating a range of state transitions of said equalized signal and designating one of said state transitions within said range of state transitions as a most probable state transition based on said binary signal;

wherein said range of state transitions of said equalized signal are limited to:

a state transition of said equalized signal corresponding to a change point of said binary signal; and a state transition of said equalized signal corresponding to a change of said binary signal occurring with timing delayed by a change, point of said binary signal by 1 sampling period.

2. A digital-signal playback apparatus according to claim 1 wherein said judgment means comprises:
   a likelihood computing means for computing a degree of likelihood for each of said state transitions within said range of state transitions by cumulating distances of said equalized signal from possible amplitude reference values of said equalized signal;
   a likelihood judging means for detecting a most probable state transition from degrees of likelihood for each of said state transitions within said range of state transitions computed by said likelihood computing means; and
   a history holding means for selectively transferring a history of a transition to the same state or a history of a transition to another state in dependence on a result of a judgment on a most probable state transition formed by said likelihood judging means.

3. A digital-signal playback apparatus according to claim 1 wherein said judgment means comprises:
   a first shift register for sequentially transferring said binary signal; and
   a second shift register for sequentially transferring a delayed signal of said binary signal sequentially transferred by said first shift register,
   wherein contents of said first and second shift registers may be cross-transferred from said first shift register to said second shift register or from said second shift register to said first shift register in dependence on a detected most probable state transition for outputting as a result of discrimination.

4. A digital-signal playback apparatus according to claim 1 wherein said judgment means comprises:
   a probability computing means for computing a probability for each of said state transitions within said range of state transitions by cumulating distances of said equalized signal from possible amplitude reference values of said equalized signal; and
   a probability judging means for detecting a highest probability state transition amongst said state transitions within said range of state transitions computed by said probability computing means,
   wherein said highest probability state transition is detected with predetermined timing, a probability at a sampling point following said predetermined timing is selected in accordance with said highest probability state transition and a probability of a subsequent state transition is computed from said selected probability.

5. A digital-signal playback apparatus according to claim 1 wherein said tentative discrimination means generates said binary signal after said input signal is equalized in conformity with a predetermined characteristic.

6. A digital-signal playback apparatus according to claim 1 wherein:
   said input signal is subjected to encode processing at a shortest wavelength of at least 2T where T is a reference repetition period; and
   said tentative discrimination means carries out said tentative discrimination on said input signal by setting a sampling period at said reference repetition period T.

7. A digital-signal playback apparatus comprising:
   a tentative discrimination means for carrying out tentative discrimination on an input signal by detecting a binary signal based on a sampling result of said input signal, wherein phases of sampling points are threshold points of said input signal;
   an equalization means for carrying out equalization on said input signal to output an equalized signal; and
   a judgment means for discriminating said input signal by designating a range of state transitions of said equalized signal and designating one of said state transitions within said range of state transitions as a most probable state transition based on said binary signal.

8. A digital-signal playback apparatus according to claim 7 wherein said range of state transitions of said equalized signal are limited to:
   a state transition of said equalized signal corresponding to a change point of said binary signal; and
   a state transition of said equalized signal corresponding to a change of said binary signal occurring with timing delayed by a change, point of said binary signal by 1 sampling period.

9. A digital-signal playback apparatus according to claim 7 wherein said judgment means comprises:
   a likelihood computing means for computing a degree of likelihood for each of said state transitions within said range of state transitions by cumulating distances of said equalized signal from possible amplitude reference values of said equalized signal;
   a likelihood judging means for detecting a most probable state transition from degrees of likelihood for each of said state transitions within said range of state transitions computed by said likelihood computing means; and
   a history holding means for selectively transferring a history of a transition to the same state or a history of a transition to another state in dependence on a result of a judgment on a most probable state transition formed by said likelihood judging means.

10. A digital-signal playback apparatus according to claim 7 wherein said judgment means comprises:
    a first shift register for sequentially transferring said binary signal; and
    a second shift register for sequentially transferring a delayed signal of said binary signal sequentially transferred by said first shift register,
    wherein contents of said first and second shift registers may be cross-transferred from said first shift register to said second shift register or from said second shift register to said first shift register in dependence on a detected most probable state transition for outputting as a result of discrimination.

11. A digital-signal playback apparatus according to claim 7 wherein said judgment means comprises:
    a probability computing means for computing a probability for each of said state transitions within said range of state transitions by cumulating distances of said equalized signal from possible amplitude reference values of said equalized signal; and
    a probability judging means for detecting a highest probability state transition amongst said state transitions within said range of state transitions computed by said probability computing means,
    wherein said highest probability state transition is detected with predetermined timing, a probability at a sampling point following said predetermined timing is selected in accordance with said highest probability state transition and a probability of a subsequent state transition is computed from said selected probability.

12. A digital-signal playback apparatus according to claim 7 wherein said tentative discrimination means generates said binary signal after said input signal is equalized in conformity with a predetermined characteristic.

13. A digital-signal playback apparatus according to claim 7 wherein:
   said input signal is subjected to encode processing at a shortest wavelength of at least 2T where T is a reference repetition period; and
   said tentative discrimination means carries out said tentative discrimination on said input signal by setting a sampling period at said reference repetition period T.

14. A digital-signal playback apparatus comprising:
   a tentative discrimination means for detecting a binary signal based on a sampling result of an input signal, wherein phases of sampling points are threshold points of said input signal;
   means for reducing the number of state transitions for viterbi decoding based on said binary signal;
   an equalization means for carrying out equalization on said input signal to output an equalized signal; and
   decoding means for receiving an output of said means for reducing and said equalized signal, and for carrying out viterbi decoding with a reduced number of state transitions.

15. A digital-signal playback apparatus according to claim 14 wherein said state transitions of said equalized signal are limited to:
   a state transition of said equalized signal corresponding to a change point of said binary signal; and
   a state transition of said equalized signal corresponding to a change of said binary signal occurring with timing delayed by a change, point of said binary signal by 1 sampling period.

16. A digital-signal playback apparatus according to claim 14 wherein said tentative discrimination means generates said binary signal after said input signal is equalized in conformity with a predetermined characteristic.

17. A digital-signal playback apparatus according to claim 14 wherein:
   said input signal is subjected to encode processing at a shortest wavelength of at least 2T where T is a reference repetition period; and
   said tentative discrimination means carries out said tentative discrimination on said input signal by setting a sampling period at said reference repetition period T.

18. A digital-signal playback apparatus comprising:
   a tentative discrimination means for detecting a binary signal based on a sampling result of an input signal, wherein phases of sampling points are threshold points of said input signal;
   means for reducing the number of state transitions for viterbi decoding based on said binary signal;
   an equalization means for carrying out equalization on said input signal to output an equalized signal; and
   correcting means for correcting errors of edge pints of said binary signal according to an output of said means for reducing and said equalized signal by carrying out viterbi decoding.

19. A digital-signal playback apparatus according to claim 18 wherein said state transitions of said equalized signal are limited to:
   a state transition of said equalized signal corresponding to a change point of said binary signal; and
   a state transition of said equalized signal corresponding to a change of said binary signal occurring with timing delayed by a change, point of said binary signal by 1 sampling period.

20. A digital-signal playback apparatus according to claim 18 wherein said tentative discrimination means generates said binary signal after said input signal is equalized in conformity with a predetermined characteristic.

21. A digital-signal playback apparatus according to claim 18 wherein:
   said input signal is subjected to encode processing at a shortest wavelength of at least 2T where T is a reference repetition period; and
   said tentative discrimination means carries out said tentative discrimination on said input signal by setting a sampling period at said reference repetition period T.

* * * * *